(12) United States Patent
Yamada et al.

(10) Patent No.: US 8,430,751 B2
(45) Date of Patent: Apr. 30, 2013

(54) COMPUTER-READABLE STORAGE MEDIUM HAVING GAME PROGRAM STORED THEREIN AND GAME APPARATUS

(75) Inventors: Yoichi Yamada, Kyoto (JP); Hidemaro Fujibayashi, Kyoto (JP); Eiji Aonuma, Kyoto (JP); Yutaka Hiramuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 833 days.

(21) Appl. No.: 12/550,677

(22) Filed: Aug. 31, 2009

(65) Prior Publication Data

US 2010/0144433 A1 Jun. 10, 2010

(30) Foreign Application Priority Data

Dec. 8, 2008 (JP) ................................ 2008-312536

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................................. 463/31; 463/36; 463/37

(58) Field of Classification Search ............... 463/31, 463/36, 37
See application file for complete search history.

(56) References Cited

FOREIGN PATENT DOCUMENTS
JP 09-234285 9/1997

OTHER PUBLICATIONS

"Mario Kart 64," 1997, Nintendo, manual.*
Final Fantasy Crystal Chronicles, Feb. 9, 2004, Nintendo, manual.*

* cited by examiner

*Primary Examiner* — Michael Cuff
*Assistant Examiner* — Kevin Y Kim
(74) *Attorney, Agent, or Firm* — Nixon & Vanderhye P.C.

(57) ABSTRACT

Action information for controlling a series of at least one action performed by a first object is stored. Then the at least one action of the first object is controlled in accordance with the action information. At this time, an action of a second object is controlled in accordance with an operation signal from a predetermined input device operated by a player. Furthermore, while the action of the second object is being controlled, the information about the at least one action of the first object is displayed on a screen.

21 Claims, 20 Drawing Sheets

F I G. 1
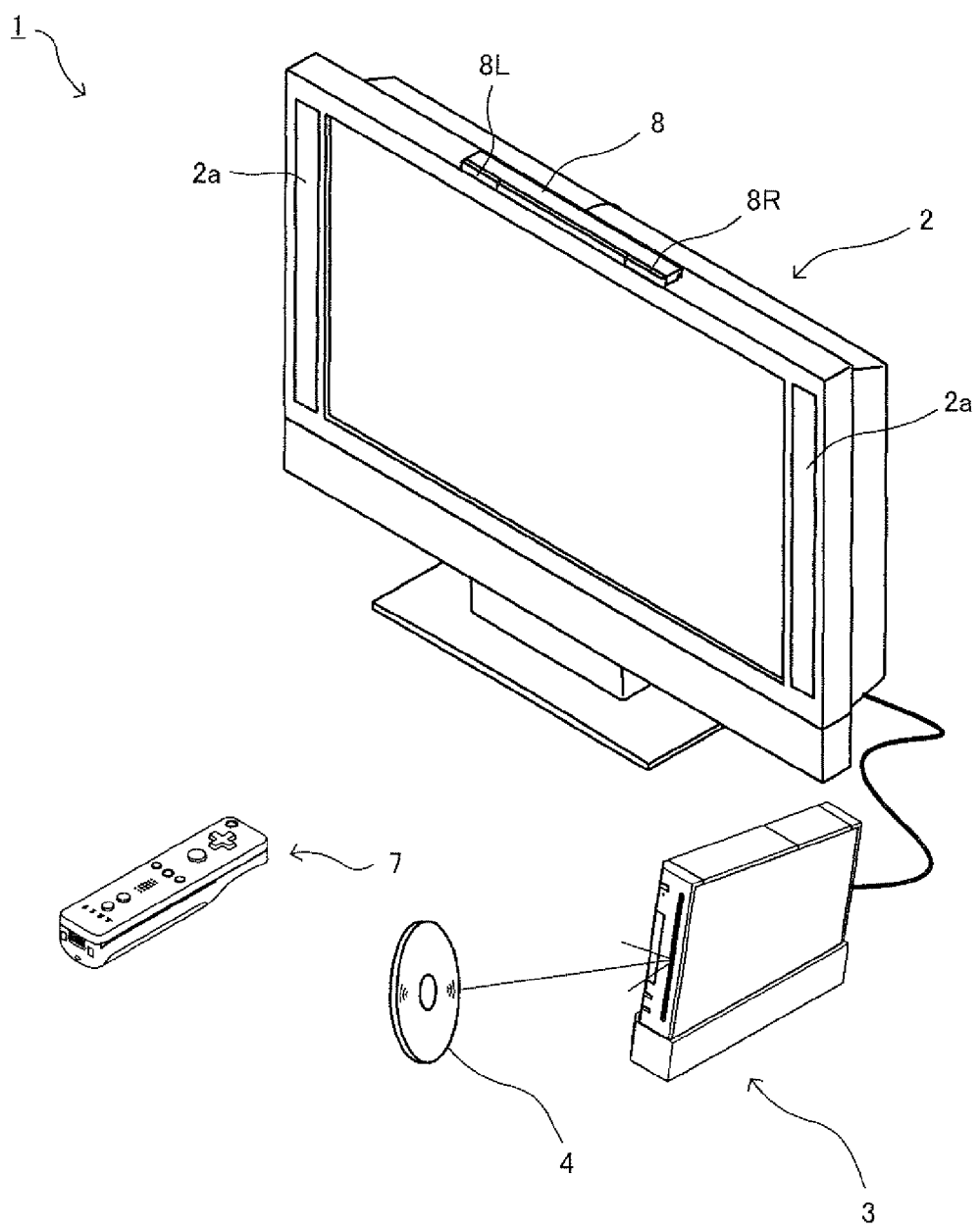

FIG. 3
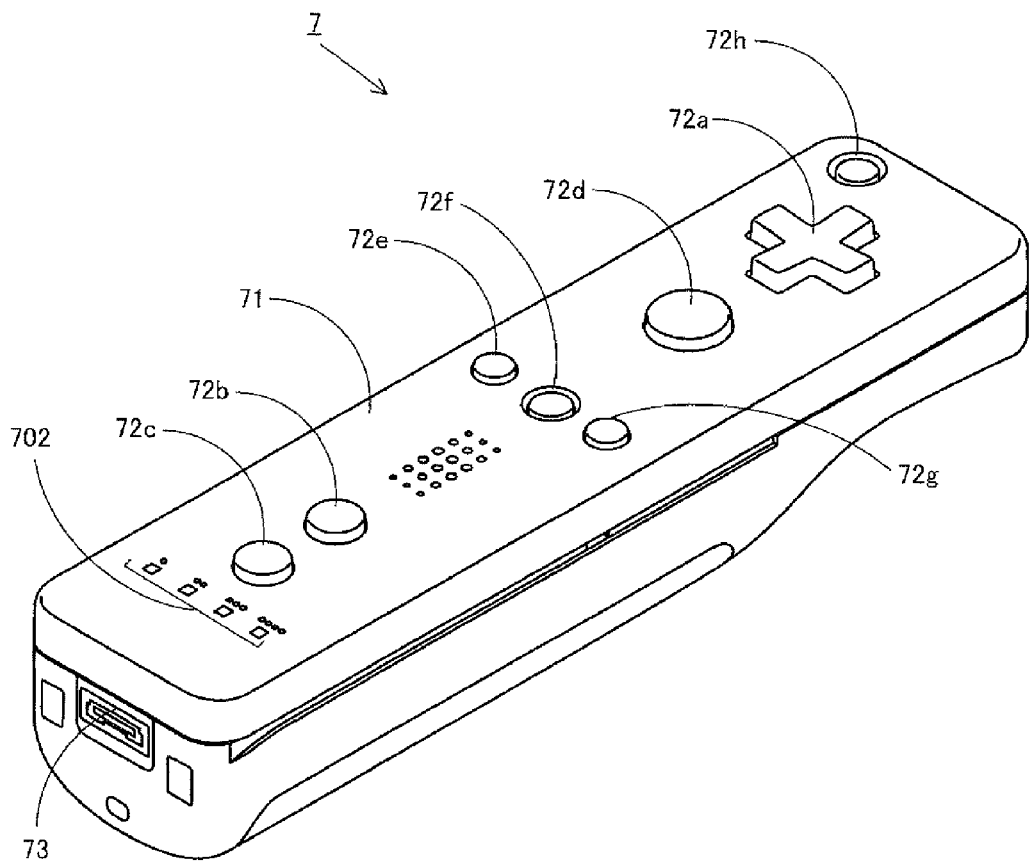
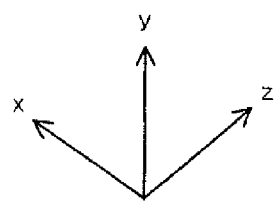

F I G. 7
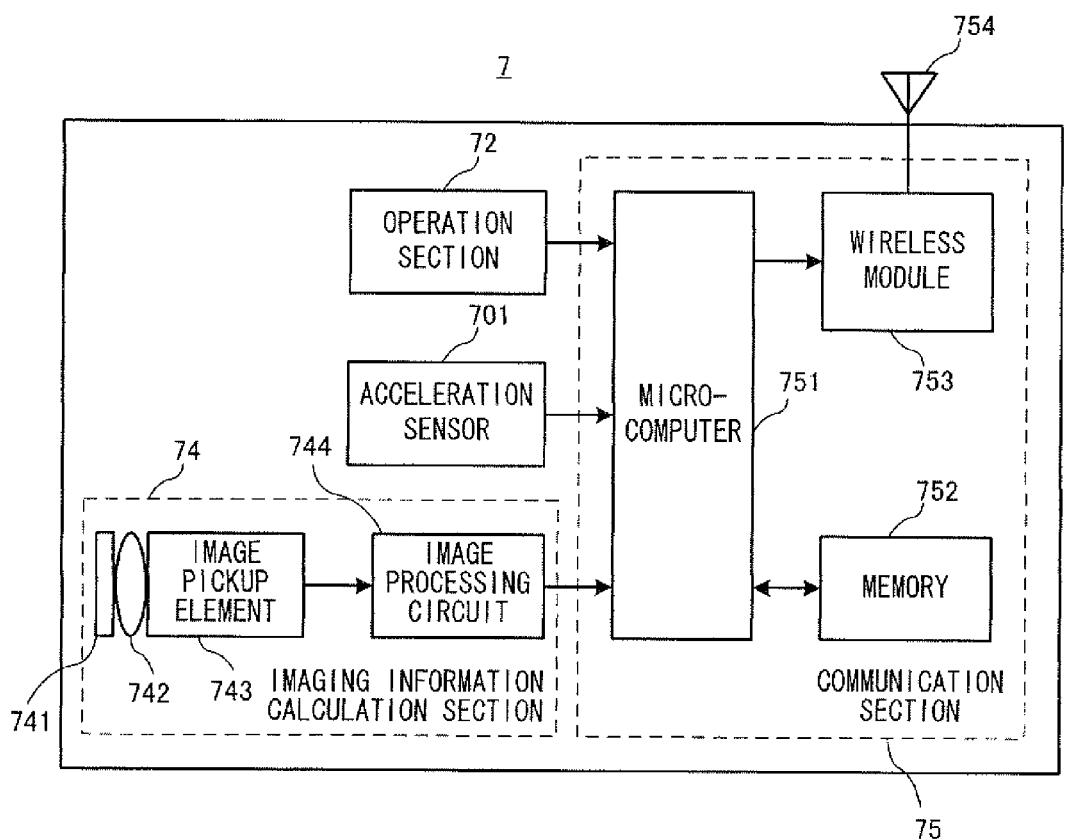

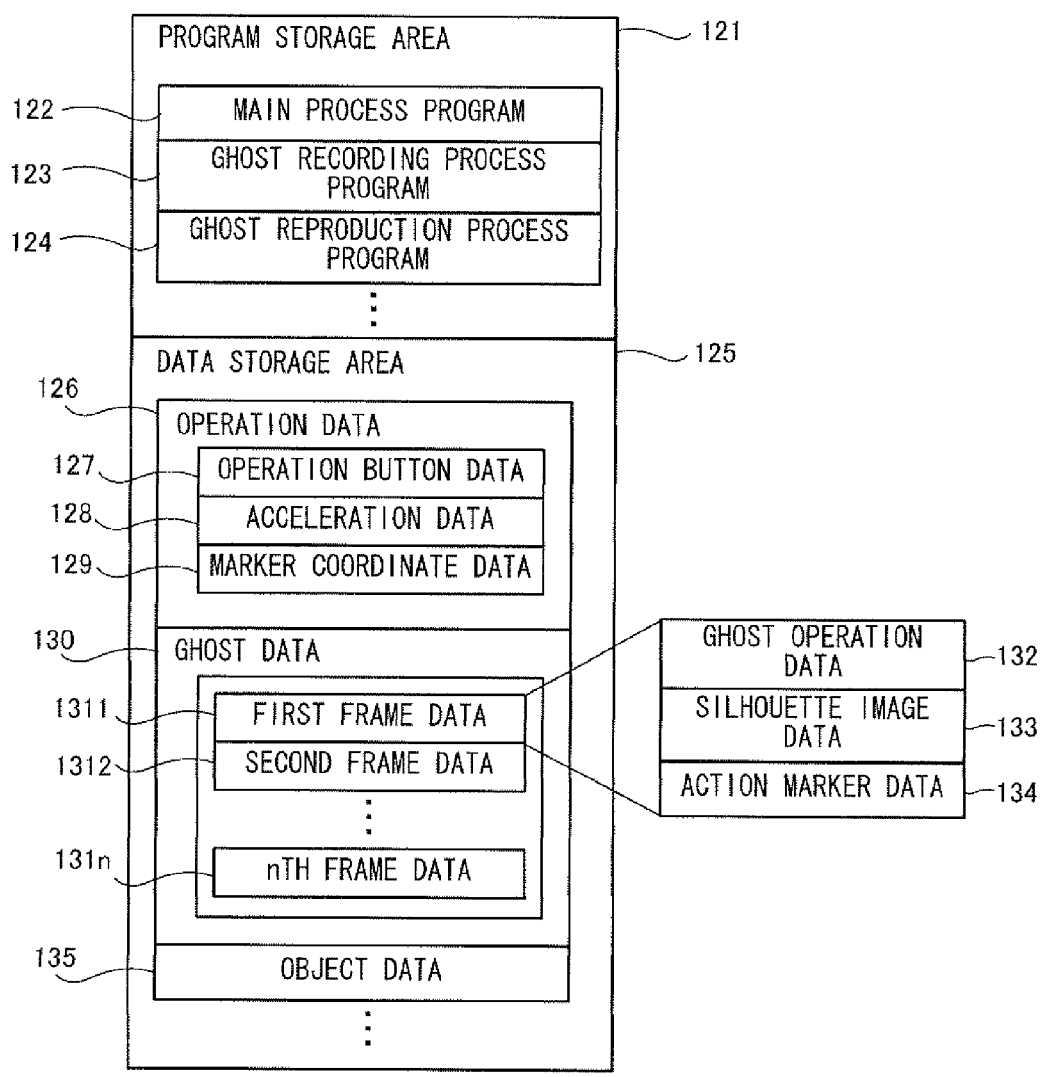

COMPUTER-READABLE STORAGE MEDIUM HAVING GAME PROGRAM STORED THEREIN AND GAME APPARATUS

CROSS REFERENCE TO RELATED APPLICATION

The disclosure of Japanese Patent Application No. 2008-312536, filed on Dec. 8, 2008, is incorporated herein by reference.

BACKGROUND OF THE INVENTION

1. Field of the Invention

The present invention relates to a computer-readable storage medium having stored there in a game program for controlling an action of an object arranged in a virtual game space and to a game apparatus, and more particularly, to a computer-readable storage medium having stored therein a game program for controlling actions of a first object and a second object arranged in a virtual game space and to a game apparatus.

2. Description of the Background Art

Conventionally, there has been known a game apparatus which allows history information about a play performed by a player in a certain game session to be recorded so as to be reproducible in another game session (for example, Japanese Laid-open Patent Publication No. 9-234285). The game apparatus allows a player to play a shooting game by controlling a fighter aircraft in a bird's eye view screen. In a first game session, position coordinates of the fighter aircraft and a firing timing of a missile, both controlled by the player, are recorded. Then, in a second game session which is different from the first game session, the player controls the second fighter aircraft while the movement of the first fighter aircraft is being reproduced based on the recorded information. Thus, the player is able to enjoy a simulated cooperation play even when playing alone.

However, the game apparatus as described above has the following problems. That is, in the second game session, although the movement and the attack of the fighter aircraft which have been recorded in the first game session are reproduced, the player cannot know in advance the movement of the fighter aircraft, that is, the player cannot know in advance when and in which direction the fighter aircraft is going to move or when the fighter aircraft is going to attack. Accordingly, in performing the simulated cooperation play as described above in the second game session, the player needs to remember the details of the operations which the player has performed in the first game session. Moreover, in the second game session, while controlling the second fighter aircraft, the player needs to follow with his/her eyes the movement of the first fighter aircraft in the first game session being reproduced, so as to understand the movement. As a result, in the second game session, the player may fail to have a smooth cooperation play with the first fighter aircraft, whereby the entertaining feature of the game may be spoiled.

SUMMARY OF THE INVENTION

Therefore, an object of the present invention is to provide a computer-readable storage medium having a game program stored therein which enables a smooth cooperation play between a first object that performs an action based on pre-stored action information and a second object controlled by a player, and to provide a game apparatus.

The present invention has the following features to attain the object mentioned above. The reference numerals, supplementary descriptions and the like in the parentheses in the following description indicate an exemplary correspondence with the embodiment described below in order to aid in understanding the present invention and are not intended to limit, in any way, the scope of the present invention.

A first aspect of the present invention is directed to a computer-readable storage medium having a game program stored therein, the game program being executed by a computer of a game apparatus for controlling an action of a first object and an action of a second object arranged in a virtual game space. The game program causes the computer to function as action information storage means, first object action reproduction means, operation reception means, second object control means, action information display means. The action information storage means stores action information for controlling a series of at least one action performed by the first object. The first object action reproduction means controls the at least one action of the first object in accordance with the action information stored in the action information storage means. The operation reception means receives an operation signal from a predetermined input device operated by a player while the at least one action of the first object is being controlled by the first object action reproduction means. The second object control means controls an action of the second object in accordance with the operation signal received by the operation reception means. The action information display means displays, on a screen, information about the at least one action of the first object being controlled by the first object action reproduction means while the action of the second object is being controlled by the second object control means.

According to the first aspect of the present invention, information about the action of the first object in accordance with the action information is displayed on a screen while the second object is being controlled in accordance with the operation performed by the player, thereby enabling a smooth cooperation play between the first object and the second object controlled by the player.

In a second aspect based on the first aspect, the action information display means displays information indicating a timing at which the first object performs a predetermined action.

According to the second aspect of the present invention, it is possible for the player to cause the second object to perform a predetermined action at the timing at which the first object performs the predetermined action.

In a third aspect based on the first aspect, the action information display means displays information indicating a time period from a current time to a time when the first object the at least one action of which is being controlled by the first object action reproduction means performs a predetermined action.

In the third aspect of the present invention, it is possible for the player to easily know the timing at which the first object performs the predetermined action.

In a fourth aspect based on the first aspect, the action information display means displays, as the information about the at least one action of the first object, a current time image indicating a status of progress of the series of the at least one action of the first object indicated by the action information, and a timing information image indicating, on a screen, at a position which corresponds to a time when the first object performs a predetermined action, that the predetermined action is to be performed.

According to the fourth aspect of the present invention, it is possible for the player to easily know the current time and the timing at which the first object to perform the predetermined action.

In a fifth aspect based on the first aspect, the action information display means displays, as the information about the at least one action of the first object, a total time information image, displayed in a form of a graph, indicating a time period taken for the series of the at least one action of the first object indicated by the action information, a current time image indicating a status of progress of the series of the at least one action of the first object indicated by the action information, and a timing information image indicating, on the total time information image, at a position which corresponds to a time when the first object performs a predetermined action, that the predetermined action is to be performed.

According to the fifth aspect of the present invention, it is possible for the player to more easily know the status of progress of the action of the first object.

In a sixth aspect based on the fifth aspect, the action information display means displays, as the current time image, a two-dimensional image indicating a posture of the first object the at least one action of which is being controlled by the first object action reproduction means.

According to the sixth aspect of the present invention, it is possible for the player to intuitively know the action of the first object.

In a seventh aspect based on the sixth aspect, the game program further causes the computer to function as first object imaging means and two-dimensional image generation means. The first object imaging means takes an image of the first object by using a second virtual camera different from a first virtual camera which takes an image of the virtual game space. The two-dimensional image generation means generates the two-dimensional image in accordance with image data obtained from the image taken by the first object imaging means.

According to the seventh aspect of the present invention, it is possible for the player to intuitively know the action of the first object.

In an eighth aspect based on the first aspect, the game program further causes the computer as first object control means and action information generation means. The first object control means controls the at least one action of the first object in accordance with the operation signal from the predetermined input device operated by the player. The action information generation means causes the action information storage means to store, as the action information, data representing the at least one action of the first object controlled by the first object control means.

In a ninth aspect based on the eighth aspect, the first object control means controls, in accordance with the operation signal from the predetermined input device operated by the player, the at least one action of the first object such that the first object performs at least a predetermined action.

According to the eighth and the ninth aspects of the present invention, it is possible for the player to cause the first object to perform the action which the player wants to, whereby the entertaining feature of the game is enhanced.

In a tenth aspect based on the eighth aspect, the action information generation means causes the action information storage means to store, as the action information, operation data representing the operation signal from the predetermined input device during the time when the first object is being controlled by the first object control means.

According to the tenth aspect of the present invention, it is possible to reduce the capacity of the memory necessary for storing the action of the first object.

In an eleventh aspect based on the first aspect, the game program further causes the computer to function as game processing means for executing predetermined game processing in a case where a timing at which the first object being controlled by the first object action reproduction means has performed a predetermined action and a timing at which the second object being controlled by the second object control means has performed a predetermined action have satisfied a predetermined condition.

According to the eleventh aspect of the present invention, it is possible to enhance the entertaining feature of the game.

In a twelfth aspect based on the first aspect, the game program further causes the computer to function as cancel means for causing the first object action reproduction means to cancel controlling the at least one action of the first object when the at least one action of the first object is being controlled by the first object action reproduction means.

According to the twelfth aspect of the present invention, when the player fails in controlling the second object while the first object is performing an action, it is possible for the player to immediately try again controlling the second object.

In a thirteenth aspect based on the fourth aspect, the predetermined action includes a plurality of kinds of actions, and the timing information image varies depending on the plurality of kinds of actions.

According to the thirteenth aspect of the present invention, it is possible to play a cooperation play using various actions, thereby further enhancing the entertaining feature of the game.

In a fourteenth aspect based on the first aspect, the game program further causes the computer to function as moving path display means for displaying on the screen a moving path of the first object in accordance with the action information stored in the action information storage means.

According to the fourteenth aspect of the present invention, it is possible for the player to know the manner the first object has moved, thereby enabling a smooth cooperation play.

In a fifteenth aspect based on the first aspect, the game program further causes the computer to function as first object action reproduction start means for causing the first object action reproduction means to start controlling again the at least one action of the first object when the first object action reproduction means has ended controlling the at least one action of the first object.

According to the fifteenth aspect of the present invention, it is not necessary for the player to perform a predetermined operation to resume control of the action of the first object, whereby the convenience for the player is enhanced.

In a sixteenth aspect based on the first aspect, the game program further causes the computer to function as timing determination means, first object action reproduction start means, and game processing means. The timing determination means determines whether or not a timing at which the first object being controlled by the first object action reproduction means has performed a predetermined action and a timing at which the second object being controlled by the second object control means has performed a predetermined action have satisfied a predetermined condition. The first object action reproduction start means causes the first object action reproduction means to start controlling again the at least one action of the first object when the first object action reproduction means has ended controlling the at least one action of the first object, in a case where the timing determination means has determined that the predetermined condition is not satisfied, while the at least one action of the first object is being controlled by the first object action reproduction means. The game processing means executes a predetermined game processing in a case where the timing determination means has determined that the predetermined condition is satisfied while the at least one action of the first object is being controlled by the first object action reproduction means.

According to the sixteenth aspect of the present invention, the action of the first object can be repeatedly reproduced only when the player fails in performing a cooperation play, thereby enhancing the convenience for the player.

In a seventeenth aspect based on the eighth aspect, the action information generation means causes the action information storage means to start storing, as the action information, data representing the at least one action of the first object controlled by the first object control means in a case where the operation signal from the predetermined input device operated by the player represents a predetermined operation.

According to the seventeenth aspect of the present invention, it is possible to record, from any time in the game, the action of the first object, whereby the degree of freedom in recording the action is increased.

In an eighteenth aspect of the present invention, a game apparatus for controlling an action of a first object and an action of a second object arranged in a virtual game space includes action information storage means, first object action reproduction means, operation reception means, second object control means, and action information display means. The action information storage means stores action information for controlling a series of at least one action performed by the first object. The first object action reproduction means controls the at least one action of the first object in accordance with the action information stored in the action information storage means. The operation reception means receives an operation signal from a predetermined input device operated by a player while the at least one action of the first object is being controlled by the first object action reproduction means. The second object control means controls an action of the second object in accordance with the operation signal received by the operation reception means. The action information display means displays, on a screen, information about the at least one action of the first object being controlled by the first object action reproduction means while the second object is being controlled by the second object control means.

According to the eighteenth aspect of the present invention, it is possible to obtain the same advantage as in the first aspect of the present.

According to the present invention, information about the action of the first object is displayed on the screen, thereby allowing the player to know the action in advance. This enables a smooth cooperation play between the first object and the second object controlled by the player.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view illustrating a game system 1 according to an embodiment of the present invention;

FIG. 3 is a perspective view of a controller 7 shown in FIG. 1 as viewed from the top rear side thereof;

FIG. 7 is a block diagram illustrating a structure of the controller 7 shown in FIG. 3;

FIG. 24 is a diagram illustrating a memory map of a main memory 12 of the game apparatus body 3;

FIG. 25 is a diagram illustrating an exemplary structure of operation button data 127;

DESCRIPTION OF THE PREFERRED EMBODIMENTS

Figure 2:
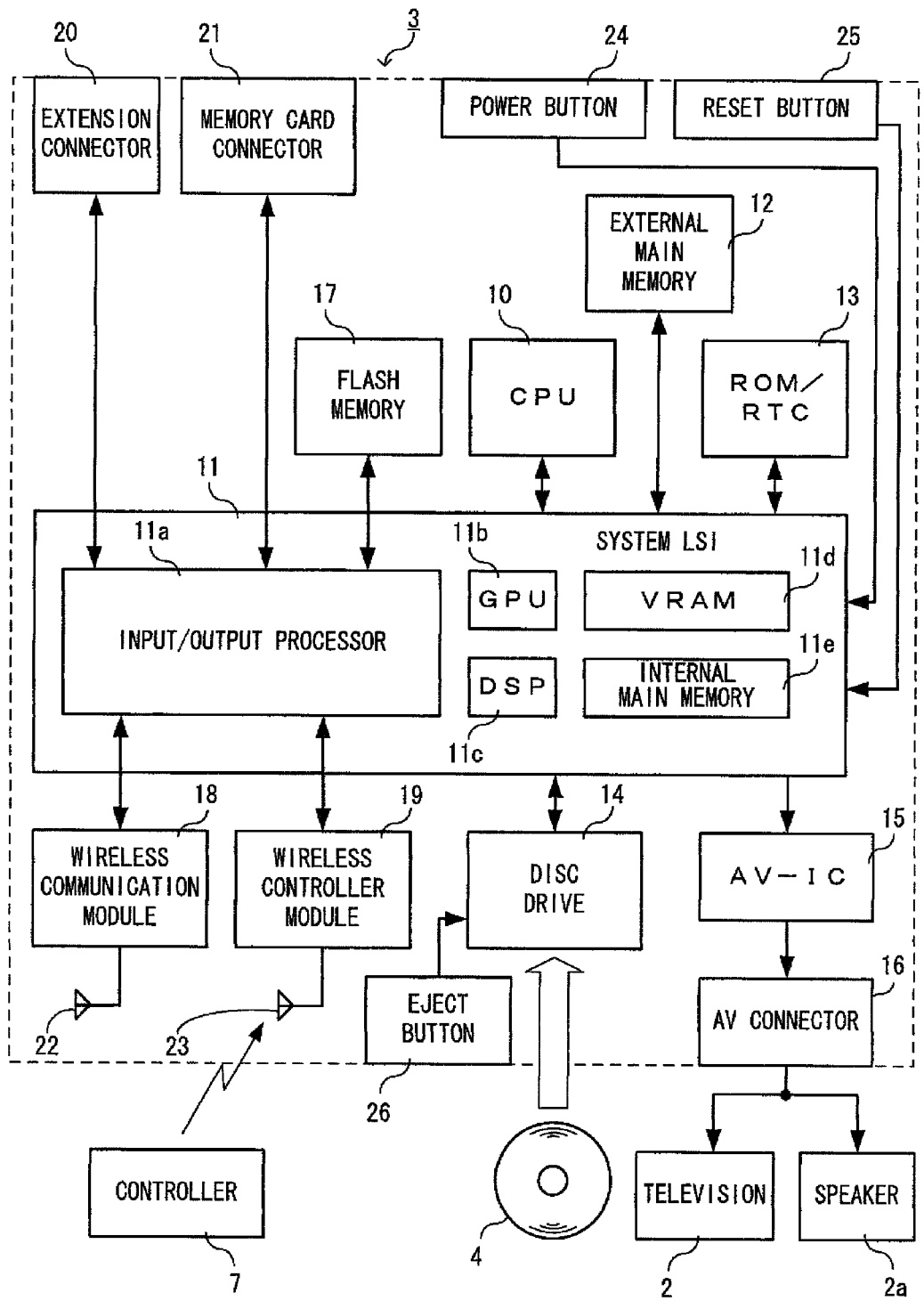
FIG. 2 is a functional block diagram of a game apparatus body 3 shown in FIG. 1.

Hereinafter, an embodiment of the present invention will be described with reference to the drawings. Note that the present invention is not limited to this embodiment.

(Overall Configuration of Game System)

With reference to FIG. 1, a game system 1 including a game apparatus according to the embodiment of the present invention will be described. FIG. 1 is an external view illustrating the game system 1. Hereinafter, a game apparatus and a game program according to the embodiment will be described by using a stationary game apparatus as an example. As shown in FIG. 1, the game system 1 includes a television receiver (hereinafter, referred to simply as a "television") 2, a game apparatus body 3, an optical disc 4, a controller 7, and a marker section 8. The system allows the game apparatus body 3 to execute game processing based on game operations that are performed using the controller 7.

Into the game apparatus body 3, the optical disc 4, which typifies an information storage medium and is used by the game apparatus body 3 in an exchangeable manner, is detachably inserted. In the optical disc 4, the game program executed by the game apparatus body 3 is stored. The game apparatus body 3 has, on the front surface thereof, an opening through which the optical disc 4 is inserted. The game apparatus body 3 performs the game processing by reading and executing the game program stored in the optical disc 4 which is inserted in the game apparatus body 3 through the opening.

The game apparatus body 3 is connected via a connection cord to the television 2 typifying a display device. The television 2 displays a game image generated through the game processing executed by the game apparatus body 3. Further, the marker section 8 is provided in the vicinity of the screen of the television 2 (above the screen of the television 2 in FIG. 1). The marker section 8 includes two markers, a marker 8R and a marker 8L, at both ends thereof. Specifically, each of the markers 8R and 8L includes at least one infrared LED, and emits an infrared light forward from the television 2. The marker section 8 is connected to the game apparatus body 3, and the game apparatus body 3 is capable of controlling each infrared LED included in the marker section 8 so as to be lit up.

The controller 7 is an input device for supplying, to the game apparatus body 3, operation data representing an operation performed on the controller 7, that is, operation signals. The controller 7 is connected to the game apparatus body 3 by wireless communication. In the present embodiment, for example, the Bluetooth (registered trademark) technology is used for the wireless communication between the controller 7 and the game apparatus body 3. In another embodiment, the controller 7 and the game apparatus body 3 may communicate with each other by a wired connection.

(Internal Structure of Game Apparatus Body 3)

Next, with reference to FIG. 2, an internal structure of the game apparatus body 3 will be described. FIG. 2 is a block diagram illustrating a structure of the game apparatus body 3. The game apparatus body 3 includes a CPU 10, a system LSI 11, an external main memory 12, a ROM/RTC 13, a disc drive 14, an AV-IC 15, and the like.

The CPU 10, serving as a game processor, executes the game program stored in the optical disc 4 so as to perform the game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transfer between respective components connected thereto, generation of an image to be displayed, and acquisition of data from an external apparatus. An internal structure of the system LSI 11 will be described below. The external main memory 12, which is of a volatile type, stores programs, such as a game program loaded from the optical disc 4 or a flash memory 17, and various data, and is used as a work area or a buffer area for the CPU 10. The ROM/RTC 13 includes a ROM (so-called boot ROM) incorporating a program for booting the game apparatus body 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output processor 11a, a GPU (graphics processor unit) 11b, a DSP (digital signal processor) 11c, a VRAM 11d, and the internal main memory 11e. These components 11a to 11e are connected to each other via an internal bus not shown.

The GPU 11b, which is a part of rendering means, generates an image in accordance with a graphics command supplied from the CPU 10. More specifically, the GPU 11b performs calculation processes necessary for displaying 3D graphics in accordance with the graphics command, such as a process of transforming 3D coordinates to 2D coordinates, which is a preprocess for rendering, and a final rendering process such as texture mapping, thereby generating game image data. The CPU 10 supplies, to the GPU 11b, an image generation program necessary for generating the game image data in addition to the graphics command. The VRAM 11d stores data (such as polygon data and texture data) necessary for the GPU 11b to execute the graphics command. When an image is generated, the GPU 11b generates image data by using the data stored in the VRAM 11d.

The DSP 11c functions as an audio processor, and generates audio data by using sound data and sound waveform (tone) data stored in the internal main memory 11e or the external main memory 12. The internal main memory 11e stores a program and various data, and is used as a work area or a buffer area for the CPU 10, as with the external main memory 12.

The image data and the audio data generated as described above, are read by the AV-IC 15. The AV-IC 15 outputs the read image data to the television 2 via an AV connector 16, and also outputs the read audio data to speakers 2a of the television 2. Thus, an image is displayed on the television 2, and sounds are outputted from the speakers 2a.

The input/output processor (I/O processor) 11a executes data reception and transmission among the components connected thereto and download of data from an external apparatus. The input/output processor 11a is connected to the flash memory 17, a wireless communication module 18, a wireless controller module 19, an extension connector 20, and a memory card connector 21. To the wireless communication module 18, an antenna 22 is connected, and to the wireless controller module 19, an antenna 23 is connected.

The input/output processor 11a is connected to a network via the wireless communication module 18 and the antenna 22 so as to communicate with other game apparatuses or various servers connected to the network. The input/output processor 11a accesses the flash memory 17 at regular time intervals so as to detect presence or absence of data which is required to be transmitted to the network. When the data to be transmitted is detected, the data is transmitted to the network via the wireless communication module 18 and the antenna 22. Further, the input/output processor 11a receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus body 3 and other game apparatuses or the various servers, but also saved data (result data or progress data of the game) of a game played with the game apparatus body 3.

Further, the input/output processor 11a receives the operation data transmitted from the controller 7, via the antenna 23 and the wireless controller module 19, and (temporarily)

stores the operation data in a buffer area of the internal main memory 11e or the external main memory 12.

Further, the input/output processor 11a is connected to the extension connector 20 and the memory card connector 21. The extension connector 20 is a connector used for an interface such as a USB or an SCSI, and is connected to a medium such as an external storage medium, or a peripheral device such as another controller, or a wired communication connector so as to allow communication with the network, without using the wireless communication module 18. The memory card connector 21 is a connector for connecting, to the memory card connector 21, an external storage medium such as a memory card. For example, the input/output processor 11a is able to access the external storage medium via the extension connector 20 or the memory card connector 21, so as to store data in the external storage medium or read data from the external storage medium.

The game apparatus body 3 includes a power button 24, a reset button 25, and an eject button 26. The power button 24 and the reset button 25 are connected to the system LSI 11. When the power button 24 is pressed so as to be ON, the power is supplied to the respective components of the game apparatus body 3 via an AC adapter not shown. Further, when the power button 24, which is ON, is pressed again, the game apparatus body 3 shifts to a low power standby mode. Also in this state, power is being supplied to the game apparatus body 3, and therefore the game apparatus body 3 can always be connected to the network such as the Internet. When the power, which is ON, is to be turned OFF, the power can be turned OFF by pressing the power button 24 for a predetermined time period or longer. When the reset button 25 is pressed, the system LSI 11 restarts the boot program of the game apparatus body 3. The eject button 26 is connected to the disc drive 14. When the eject button 26 is pressed, the optical disc 4 is ejected from the disc drive 14.

Figure 4:
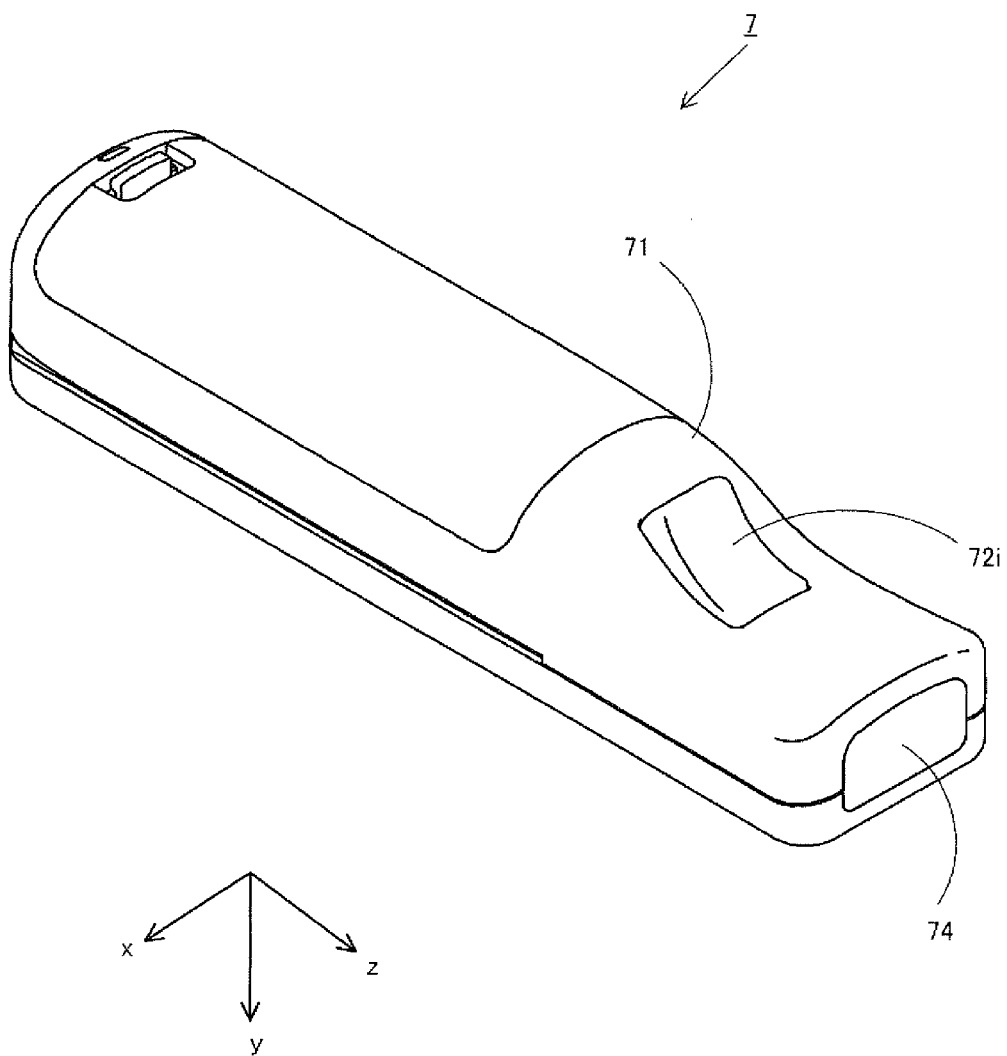
FIG. 4 is a perspective view of the controller 7 shown in FIG. 3 as viewed from the bottom front side thereof.

With reference to FIGS. 3 and 4, the controller 7 will be described. FIG. 3 is a perspective view of the controller 7 as viewed from the top rear side thereof. FIG. 4 is a perspective view of the controller 7 as viewed from the bottom front side thereof.

As shown in FIGS. 3 and 4, the controller 7 includes a housing 71, and an operation section 72, having a plurality of operation buttons, provided on a surface of the housing 71. The housing 71 of the present embodiment has a generally parallelepiped shape extending in a longitudinal direction from front to rear. The overall size of the housing 71 is small enough to be held by one hand of an adult or even a child, and the housing 71 is formed by, for example, plastic molding.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on crossshaped projecting portions, respectively, arranged at intervals of 90 degrees. A player selects one of the front, rear, right and left directions by pressing a corresponding one of the operation portions of the cross key 72a. Through an operation on the cross key 72a, the player can, for example, indicate a direction in which a player object or the like appearing in a virtual game world is to move, or select one of a plurality of options.

Although the cross key 72a is an operation section for outputting an operation signal in accordance with the aforementioned direction input operation performed by the player, such an operation section may be provided in another form. For example, an operation section, which has four push switches arranged in crisscross formation and which is capable of outputting an operation signal in accordance with pressing of one of the push switches by the user, may be provided. Alternatively, an operation section, which has a composite switch having, in addition to the above four push switches, a center switch provided at the center of the above crisscross formation, may be provided. Still alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the user presses a head thereof, outputting a corresponding operation signal. For example, functions of a No. 1 button, a No. 2 button, and an A button are assigned to the operation buttons 72b to 72d, respectively. Further, functions of a minus button, a home button and a plus button are assigned to the operation buttons 72e to 72g, for example. Various operation functions in accordance with the game program executed by the game apparatus body 3 are assigned to the operation buttons 72a to 72g, respectively. In an exemplary arrangement shown in FIG. 3, the operation buttons 72b to 72d are arranged in a line at the center in the front-rear direction on the top surface of the housing 71. The operation buttons 72e to 72g are arranged in a line in the left-right direction between the operation buttons 72b and 72d on the top surface of the housing 71. The operation button 72f has atop surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus body 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (a number) is assigned to the controller 7 such that the controller 7 is distinguishable from other controllers 7. The LEDs 702 are used for, e.g., informing the player of the controller type currently set for the controller 7. Specifically, when the controller 7 transmits transmission data to the game apparatus body 3, one of the plurality of LEDs 702 is lit up so as to correspond to the controller type.

On the top surface of the housing 71, sound holes for outputting to the outside a sound from a speaker (speaker 706 shown in FIG. 5) described below is formed between the operation button 72b and the operation buttons 72e to 72g.

On the bottom surface of the housing 71, a recessed portion is formed. As described below in detail, the recessed portion is formed at a position at which an index finger or middle finger of a player is located when the player holds the controller 7 with one hand so as to orient the front surface thereof to the markers 8L and 8R. On a slope surface of the recessed portion on the bottom surface of the housing 71, an operation button 72i is provided. The operation button 72i is an operation section functioning as, for example, a B button.

On the front surface of the housing 71, an image pickup element 743 which is a part of the imaging information calculation section 74 is provided. The imaging information calculation section 74 is a system for analyzing image data obtained from the image taken by the controller 7, determining an area having a high brightness in the image data, and detecting the position of the center of gravity, the size and the like of the area having a high brightness. The imaging information calculation section 74 has, for example, a maximum sampling period of about 200 frames/sec., and therefore can trace and analyze even a relatively fast motion of the controller 7. A configuration of the imaging information calculation section 74 will be described below in detail. On the rear surface of the housing 71, a connector 73 is provided. The connector 73 is, for example, an edge connector, and is used for engaging and connecting the controller 7 with, for example, a connection cable.

Here, for giving a specific description, a coordinate system set for the controller 7 is defined. As shown in FIGS. 3 and 4, x-, y-, and z-axes orthogonal to each other are defined for the controller 7. Specifically, the z-axis is defined along the longitudinal direction of the housing 71 corresponding to the front-rear direction of the controller 7, and the direction toward the front surface (the surface on which the imaging information calculation section 74 is provided) of the controller 7 is defined as the z-axis positive direction. The y-axis is defined along the top-bottom direction of the controller 7, and the direction toward the top surface (the surface on which the operation button 72a and the like are provided) of the housing 71 is defined as the y-axis positive direction. The x-axis is defined along the right-left direction of the controller 7, and the direction toward the left side surface (the side surface shown in FIG. 4 but not shown in FIG. 3) of the housing 71 is defined as the x-axis positive direction.

Figure 5:
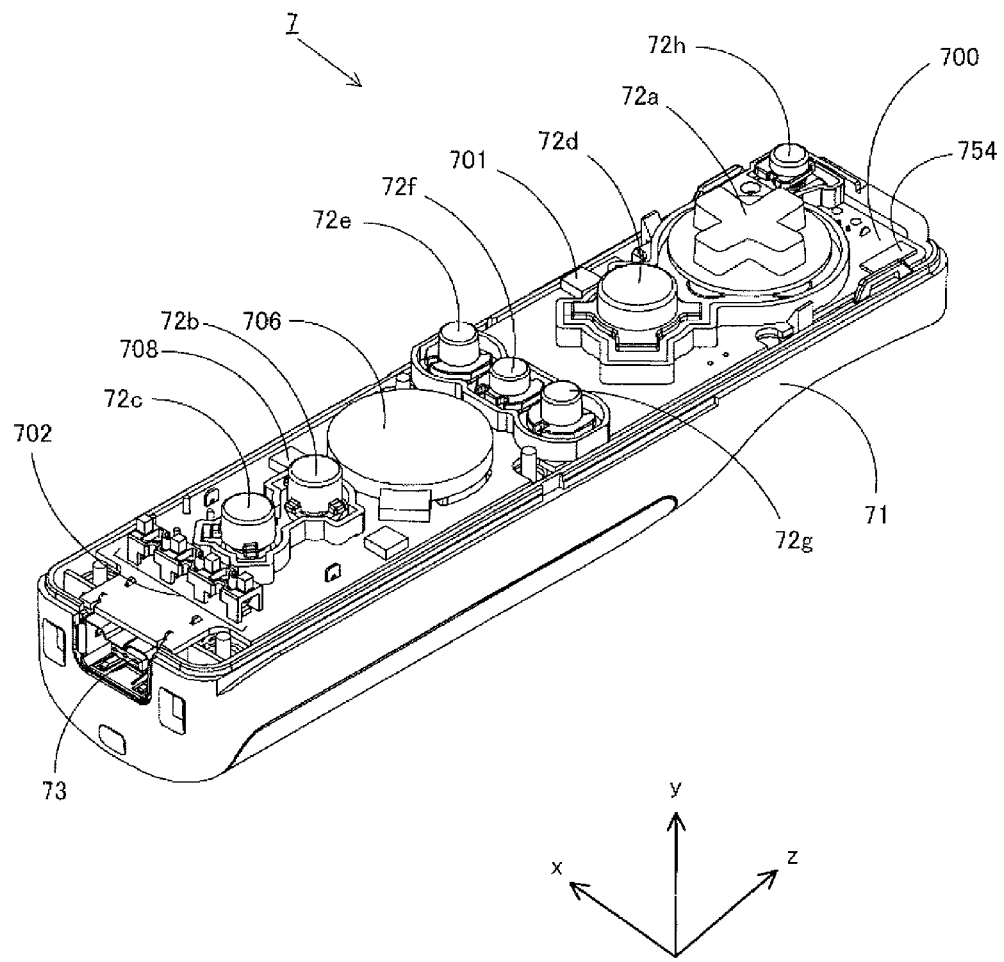
FIG. 5 is a perspective view illustrating a state where an upper housing of the controller 7 shown in FIG. 3 is removed.
Figure 6:
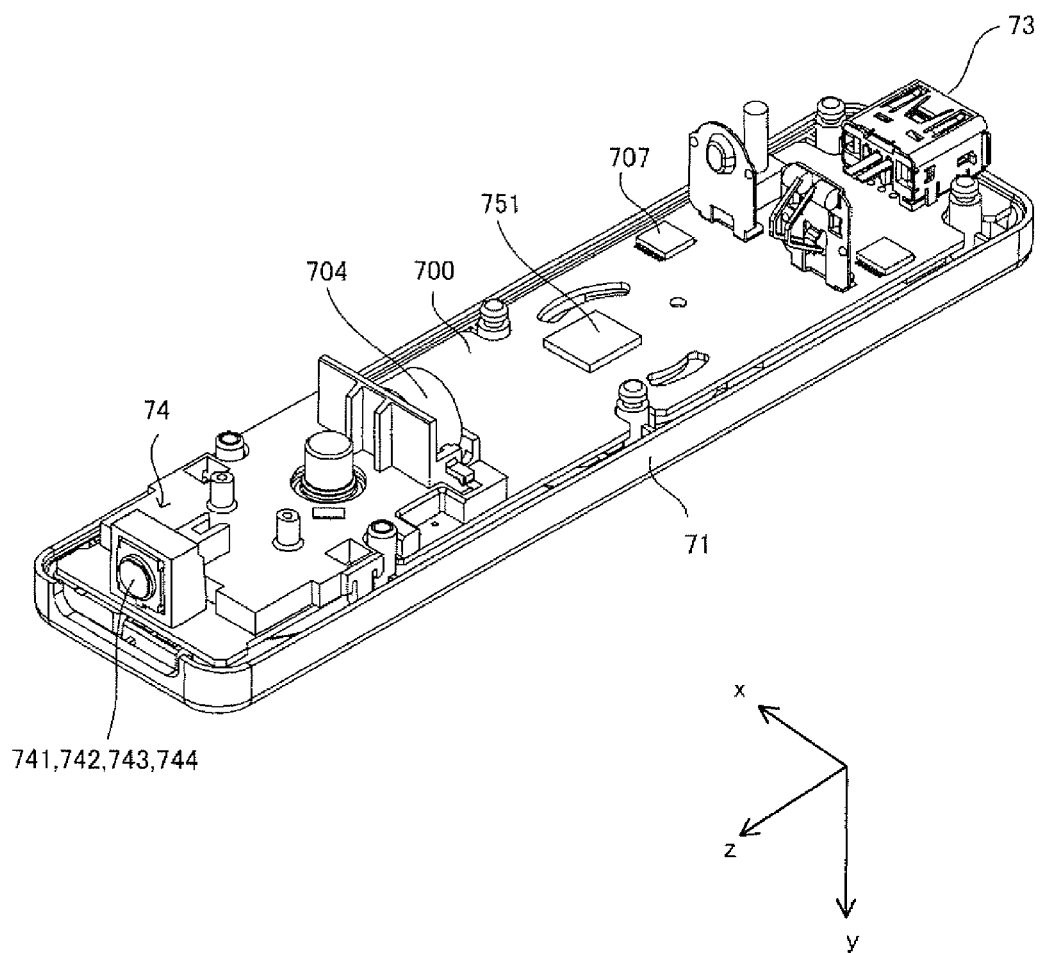
FIG. 6 is a perspective view illustrating a state where a lower housing of the controller 7 shown in FIG. 3 is removed.

With reference to FIGS. 5 and 6, an internal structure of the controller 7 will be described. FIG. 5 is a perspective view illustrating a state where an upper housing (a part of the housing 71) of the controller 7 is removed, as viewed from the rear surface side of the controller 7. FIG. 6 is a perspective view illustrating a state where a lower housing (a part of the housing 71) of the controller 7 is removed, as viewed from the front surface side of the controller 7. FIG. 6 is a perspective view illustrating a reverse side of a substrate 700 shown in FIG. 5.

As shown in FIG. 5, the substrate 700 is fixed inside the housing 71. On the top main surface of the substrate 700, the operation buttons 72a to 72h, an acceleration sensor 701, the LEDs 702, an antenna 754 and the like are provided. These components are connected to a microcomputer 751 (see FIGS. 6 and 7) and the like via wiring (not shown) provided on the substrate 700 and the like. The microcomputer 751 is exemplary button data generation means of the present invention, and functions so as to generate operation button data corresponding to a type of an operation button such as the operation button 72a. This known mechanism is realized by, for example, the microcomputer 751 detecting connection/disconnection of a wiring through a switch mechanism such as a tact switch positioned under a key top, or the like. More specifically, when a wiring is connected and energized by, for example, pressing an operation button, the microcomputer 751 detects which operation button is connected to the energized wiring so as to generate a signal in accordance with a type of the operation button having been pressed.

The wireless module 753 (see FIG. 7) and the antenna 754 allow the controller 7 to function as a wireless controller. A crystal oscillator (not shown), provided in the housing 71, generates a reference clock of the microcomputer 751 described below. On the top main surface of the substrate 700, the speaker 706 and an amplifier 708 are provided. The acceleration sensor 701 is provided to the left of the operation button 72d on the substrate 700 (that is, provided not at the center portion of the substrate 700 but near the periphery of the substrate 700). Accordingly, the acceleration sensor 701 is allowed to detect both a direction change of the gravitational acceleration and acceleration containing a component generated due to centrifugal force, in accordance with the controller 7 rotating about the longitudinal direction thereof. Therefore, by performing a predetermined calculation, the game apparatus body 3 or the like is allowed to determine the rotation of the controller 7, with preferable sensitivity, based on the acceleration data having been detected.

As shown in FIG. 6, at the front edge of the bottom main surface of the substrate 700, the imaging information calculation section 74 is provided. The imaging information calculation section 74 includes an infrared filter 741, a lens 742, the image pickup element 743 and an image processing circuit 744 located in order from the front surface of the controller 7. These components are fixed on the bottom main surface of the substrate 700. At the rear edge of the bottom main surface of the substrate 700, the connector 73 is fixed. On the bottom main surface of the substrate 700, a sound IC 707 and the microcomputer 751 are provided. The sound IC 707 is connected to the microcomputer 751 and the amplifier 708 via a wiring provided on the substrate 700 and the like, and outputs an audio signal to the speaker 706 via the amplifier 708 in accordance with sound data transmitted from the game apparatus body 3.

On the bottom main surface of the substrate 700, a vibrator 704 is fixed. The vibrator 704 may be, for example, a vibration motor or a solenoid. The vibrator 704 is connected to the microcomputer 751 via a wiring provided on the substrate 700 and the like, and is controlled so as to be ON/OFF in accordance with vibration data transmitted from the game apparatus body 3. The controller 7 is vibrated by an actuation of the vibrator 704, and the vibration is conveyed to the player's hand holding the controller 7. Thus, a so-called vibration-feedback game is realized. The vibrator 704 is positioned slightly forward from the longitudinal center of the housing 71, and therefore a vibration of the housing 71 is enhanced so as to allow a player holding the controller 7 to easily feel the controller 7 vibrating.

With reference to FIG. 7, the internal structure of the controller 7 will be described. FIG. 7 is a block diagram illustrating the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707, and the amplifier 708, which are described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pickup device such as, for example, a CMOS sensor or a CCD. The image pickup element 743 picks up an image of the infrared light collected by the lens 742. Accordingly, the image pickup element 743 picks up an image of only the infrared light which has passed through the infrared filter 741, and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing results of detecting position coordinates and a square measure of the high brightness area. The imaging information calculation section 74 is fixed to the housing 71 of the controller 7. The imaging direction of the imaging information calculation section 74 can be changed by changing the direction of the housing 71. A signal corresponding to a position and/or a movement of the controller 7 can be obtained based on the process result data outputted by the imaging information calculation section 74.

The controller 7 preferably includes a three-axis (x-axis, y-axis, and z-axis) acceleration sensor 701. The three-axis acceleration sensor 701 detects linear acceleration in three directions, i.e., the up/down direction, the left/right direction, and the forward/backward direction. Further, in another embodiment, a two-axis accelerometer which detects only linear acceleration along each of the up/down and left/right directions (or other pair of directions) may be used depending on the type of control signals used in the game processing. For example, the three-axis or two-axis acceleration sensor 701 may be of the type available from Analog Devices, Inc. or STMicroelectronics N.V. The acceleration sensor 701 may be of an electrostatic capacitance (capacitance-coupling) type that is based on silicon micro-machined MEMS (microelectromechanical systems) technology. However, an accelerometer technology (e.g., piezoelectric type or piezoresistance type) now existing or any other suitable technology later developed may be used to provide the three-axis or two-axis acceleration sensor 701.

As one skilled in the art understands, the accelerometer, as used in the acceleration sensor 701, is capable of detecting only acceleration (linear acceleration) along a straight line corresponding to each axis of the acceleration sensor. In other words, the direct output of the acceleration sensor 701 is limited to signals indicative of linear acceleration (static or dynamic) along each of the two or three axes thereof. As a result, the acceleration sensor 701 cannot directly detect movement along a non-linear (e.g., arcuate) path, rotation, rotational movement, angular displacement, tilt, position, orientation or any other physical characteristic.

However, through processing by a computer such as a processor of the game apparatus (e.g., the CPU 10) or a processor of the controller (e.g., the microcomputer 751) based on the acceleration signals outputted from the acceleration sensor 701, additional information relating to the controller 7 can be inferred or calculated (determined), as one skilled in the art will readily understand from the description herein. For example, when the processing is performed by the computer on the assumption that the controller having the acceleration sensor mounted therein is in a static state (i.e., when the processing is performed assuming that acceleration detected by the acceleration sensor is only the gravitational acceleration), if the controller is in fact in a static state, the detected acceleration is used to determine whether or not the controller is inclined with respect to the direction of gravity or how many degrees the controller is inclined with respect to the direction of gravity. More specifically, when a state where a detection axis of the acceleration sensor extends in a vertically downward direction is set as a standard state, it is possible to determine whether or not the controller is inclined, based on whether or not 1G (gravitational acceleration) is being applied, and how many degrees the controller is inclined, based on the magnitude of the acceleration applied. Further, in the case of a multi-axis acceleration sensor, it is possible to determine in detail how many degrees each axis is inclined with respect to the direction of gravity, through processing of acceleration signals detected for each axis. In this case, a processor may perform processing, based on an output from the acceleration sensor 701, for calculating data indicating an inclination angle of the controller 7. Alternatively, processing may be performed so as to infer a rough inclination of the controller 7 based on the output from the acceleration sensor 701 without performing the processing for calculating data indicating an inclination angle. In this manner, the acceleration sensor 701 can be used in combination with the processor to determine an inclination, orientation or position of the controller 7. On the other hand, on the assumption that the acceleration sensor is in a dynamic state, the acceleration sensor detects acceleration corresponding to a movement of the acceleration sensor in addition to a gravitational acceleration component. Thus, it is possible to determine, for example, a direction of the movement of the controller 7 by eliminating the gravitational acceleration component through predetermined processing. More specifically, various movements and/or positions of the controller 7 can be calculated through processing of the acceleration signals generated by the acceleration sensor 701 when the controller 7 including the acceleration sensor 701 is subjected to dynamic acceleration by the hand of a user. It is noted that even on the assumption that the acceleration sensor is in a dynamic state, it is possible to determine an inclination of the controller 7 with respect to the direction of gravity, by eliminating acceleration corresponding to a movement of the acceleration sensor through predetermined processing. In another example, the acceleration sensor 701 may include an embedded signal processor or other type of dedicated processor for performing any desired processing of the acceleration signals outputted from the accelerometers therein prior to outputting signals to the microcomputer 751. For example, the embedded or dedicated processor could convert the detected acceleration signal to a corresponding inclination angle (or into other preferred parameter) when the acceleration sensor is intended to detect static acceleration (e.g., gravitational acceleration).

In further another example, a gyro-sensor of any suitable technology incorporating, for example, a rotating or vibrating element may be used as a sensor for detecting a movement of the controller 7. Exemplary MEMS gyro-sensors that may be used in this embodiment are available from Analog Devices, Inc. Unlike the-linear acceleration sensor 701, a gyro-sensor is capable of directly detecting rotation (or angular rate) around an axis defined by the gyroscopic element (or elements) therein. Thus, due to the fundamental differences between a gyro-sensor and an acceleration sensor, corresponding changes need to be made to the processing operations that are performed on the output signals from these devices depending on which device is selected for a particular application.

Specifically, when a gyro-sensor is used instead of an acceleration sensor to calculate an inclination and orientation, significant changes are necessary. More specifically, when a gyro-sensor is used, the value of inclination is initialized at the start of detection. Then, data on angular velocity which is outputted from the gyro-sensor is integrated. Next, a change amount in inclination from the value of inclination previously initialized is calculated. In this case, the calculated inclination is obtained as a value corresponding to an angle. In contrast, when an acceleration sensor is used to calculate the inclination, the inclination is calculated by comparing the value of the gravitational acceleration of each axial component with a predetermined reference. Therefore, the calculated inclination can be represented as a vector. Thus, without initialization, an absolute direction detected using an accelerometer can be obtained. The type of the value calculated as an inclination is also different between a gyro-sensor and an acceleration sensor; i.e., the value is an angle when a gyro-sensor is used and is a vector when an acceleration sensor is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detect rotation, acceleration sensors are generally more cost-effective as compared with the gyro-sensors when used for the controller of the present embodiment.

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls operations of the sound IC 707 and the vibrator 704 based on the data received from the game apparatus body 3 by the wireless module 753 via the antenna 754. The sound IC 707 processes the sound data and the like transmitted from the game apparatus body 3 via the communication section 75. Further, the microcomputer 751 actuates the vibrator 704 based on, for example, the vibration data (for example, a signal for powering the vibrator 704 ON or OFF) transmitted by the game apparatus body 3 via the communication section 75.

Data from the controller 7 including an operation signal (key data) from the operation section 72, acceleration signals (x, y, and z-axial direction acceleration data, and hereinafter, simply referred to as acceleration data) from the acceleration sensor 701, and the process result data from the imaging information calculation section 74 are outputted to the microcomputer 751. The microcomputer 751 temporarily stores the respective input data (the key data, the acceleration data, and process result data) in the memory 752 as the transmission data which is to be transmitted to the wireless controller module 19. The wireless transmission from the communication section 75 to the wireless controller module 19 is performed periodically at predetermined time intervals. Since game processing is generally performed at a cycle of 1/60 sec., data needs to be transmitted at a cycle of a time period shorter than the cycle of the game processing. Specifically, the game process unit is 16.7 ms (1/60 sec.), and the transmission interval of the communication section 75 structured using the Bluetooth (registered trademark) technology is, for example, 5 ms. At a timing at which the transmission to the wireless controller module 19 is to be performed, the microcomputer 751 outputs the transmission data stored in the memory 752 as a series of operation information to the wireless module 753. The wireless module 753 uses, for example, the Bluetooth (registered trademark) technology to modulate the operation information onto a carrier wave of a predetermined frequency and to radiate the resultant radio wave signal from the antenna 754. Thus, data from the controller 7 including the key data from the operation section 72, the acceleration data from the acceleration sensor 701, and the process result data from the imaging information calculation section 74 are modulated into a radio wave signal by the wireless module 753, and the radio wave signal is transmitted from the controller 7. The wireless controller module 19 of the game apparatus body 3 receives the radio wave signal, and the game apparatus body 3 demodulates or decodes the radio wave signal to obtain the series of operation information (the key data, the acceleration data, and the process result data). The CPU 10 of the game apparatus body 3 performs the game processing in accordance with the obtained operation information and in accordance with the game program. When the communication section 75 is structured by using the Bluetooth (registered trademark) technology, the communication section 75 can function so as to receive transmission data which is wirelessly transmitted from another device.

Figure 8:
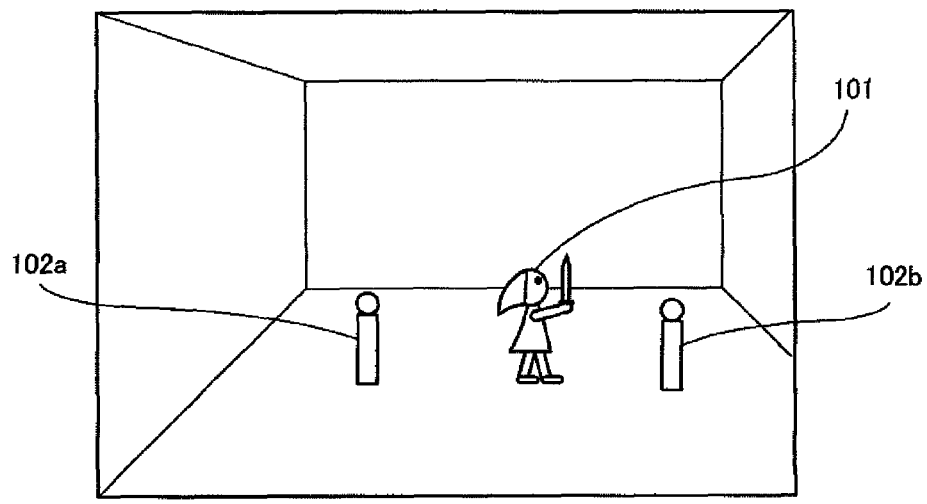
FIG. 8 is an exemplary game screen assumed in the present embodiment.

Next, the outline of the game assumed in the present embodiment will be described with reference to FIG. 8 to FIG. 17. The game is an action adventure game in which a player object is controlled in a three-dimensional virtual game space. FIG. 8 is an exemplary game screen assumed in an embodiment of the present invention. In FIG. 8, a 3D virtual game space is displayed on the game screen, in which a player object 101, and a switch 102a and a switch 102b (hereinafter the switch 102a and the switch 102b may be collectively referred to as a switch 102) are displayed in the game space. In the following, there described is a situation in which it is necessary to simultaneously turn on the switch 102a and the switch 102b in order to open a "door" which is not displayed on the screen in FIG. 8.

The switch 102a and the switch 102b can be each turned on when a "sphere" on top thereof is attacked with a sword held by the player object 101. As described above, although it is necessary to turn on both the switches at the same timing here, there exists only one player object 101 in the situation shown in FIG. 8, and thus only one of the switches can be turned on. Therefore, in this game, a character, called a "ghost" (so-called other self of the player object 101), having the same shape as the player object 101 is caused to appear. Then, the player object 101 plays a cooperation play with the "ghost", which enables simultaneous turning on the switch 102a and the switch 102b.

Hereinafter, the flow of operations from the appearance of the "ghost" to the simultaneous turning on both the switches will be described. Now, the major flow of the operations is described. In this game, first, a player performs an operation for causing a "ghost" to appear. Next, for a predetermined time period, which is 10 seconds in this game, the player controls the "ghost" so as to cause the "ghost" to perform a desired action, such as turning on the switch 102b. An operation history (key data during the time when the ghost is being controlled) of the "ghost" during this time is stored in the memory as ghost operation data. After 10 seconds, the "ghost" disappears (hereinafter, a state during the time period from the appearance to the disappearance of the "ghost" is referred to as a "ghost recording mode").

Next, the player performs an operation to instruct reproduction of the action of the "ghost" at an arbitrary place and an arbitrary timing. The operation causes the "ghost" to appear, reproducing the action of the "ghost" which the player has caused the ghost to perform in the ghost recording mode. In the example described above, the action of turning on the switch 102b is reproduced. While the action of the "ghost" is being reproduced (hereinafter referred to as a ghost reproduction mode), the player advances the game by controlling the player object 101 to perform a cooperation play with the "ghost". For example, the player performs an operation to cause the player object 101 to turn on the switch 102a at the timing at which the "ghost" turns on the switch 102b.

Figure 9:
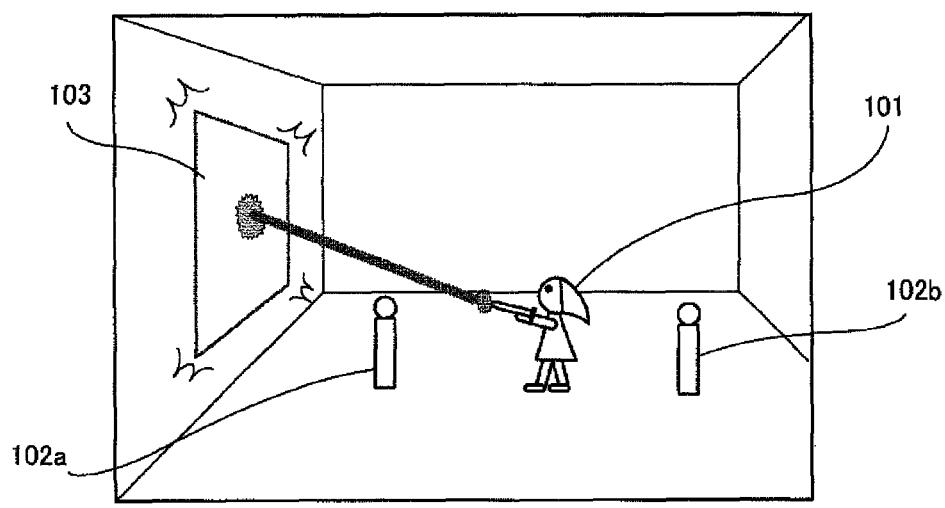
FIG. 9 is an exemplary game screen assumed in the present embodiment.

Hereinafter, the flow of the operations will be more specifically described. First, operations to cause a "ghost" to appear are described. In this game, the "ghost" can be caused to appear by using a "mirror". To be specific, by performing a predetermined operation, the player causes the player object 101 to perform an action called a "mirror shot." This is an action of causing a mirror 103 to appear on an arbitrary wall surface in the virtual game space. For example, the player object 101 is caused to perform an operation to fire a bullet called a "mirror bullet", aiming at an arbitrary wall surface. This allows the mirror 103 to appear on the wall surface hit by the "mirror bullet", as shown in FIG. 9.

Figure 10:
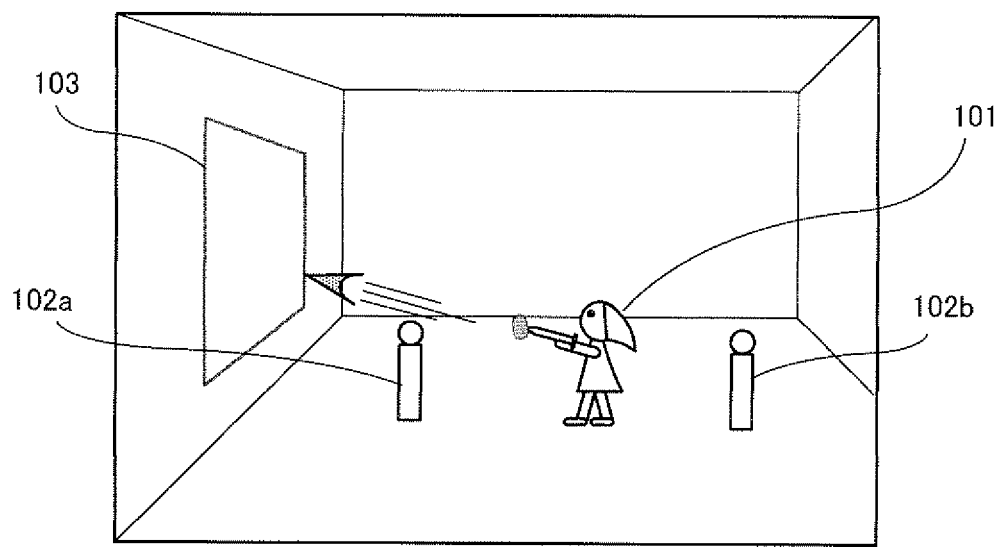
FIG. 10 is an exemplary game screen assumed in the present embodiment.

Then, the player object 101 is caused to perform an action called a "ghost shot". This action is, as shown in FIG. 10, an action of firing a bullet aiming at the player object 101 reflected in the mirror 103 which has been caused to appear as described above. This allows the player object 101 reflected in the mirror 103 to appear as a "ghost."

Figure 11:
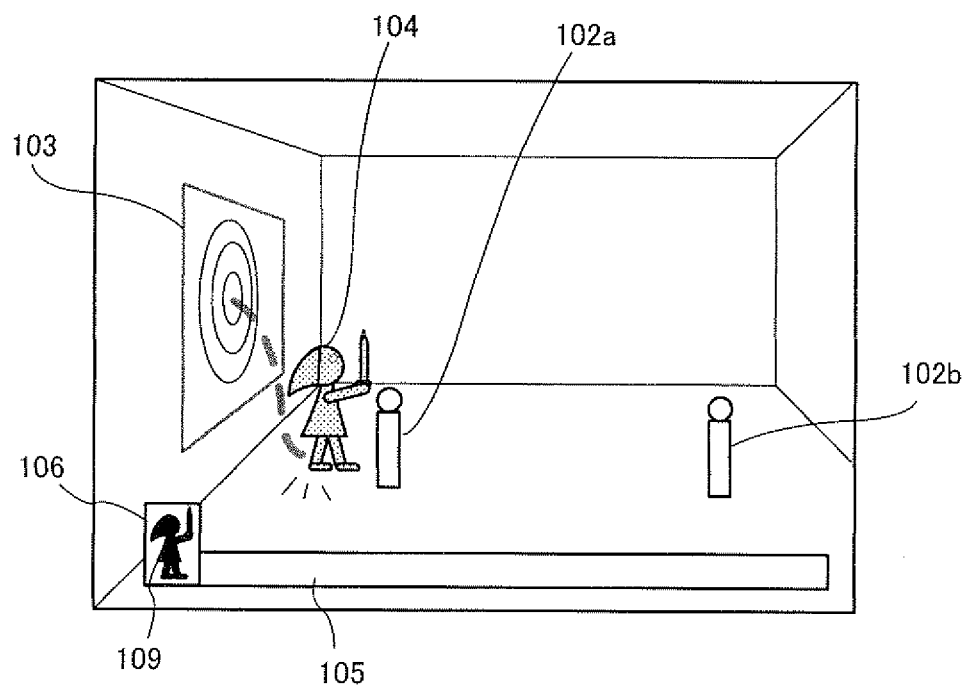
FIG. 11 is an exemplary game screen assumed in the present embodiment.

FIG. 11 is a diagram illustrating a game screen immediately after the "ghost" has appeared. FIG. 11 shows a state where the ghost 104 has come out of the mirror 103 and descended to stand. Here, in this game, once the ghost 104 appears, the time temporarily stops in the virtual game space and the player object 101 is no longer displayed on the screen. In other words, the target to be controlled by the player is temporarily switched from the player object 101 to the ghost 104. Further, a ghost information bar 105 in the form of a bar graph is newly displayed on the screen. Note that, although the ghost information bar 105 is shown in the form of a bar graph in the present embodiment, any other form, such as a circle graph, than the bar graph may be used.

The ghost information bar 105 indicates a status of progress of time in the ghost recording mode (not the time in the virtual game space but the real time) and information about an action of the ghost (in other words, the ghost information bar 105 represents a time axis. Moreover, in the example of this game, the length of the ghost information bar 105 represents 10 seconds.) In the state shown in FIG. 11, a current icon 106 for indicating the current time in the time-axis represented by the ghost information bar 105 is displayed at the left end of the ghost information bar 105. The current icon 106 moves from the left to the right as a function of time. In other words, the time and the status of progress of actions performed by the ghost 104 are known by referring to the position of the current icon 106 on the ghost information bar 105 (in the example shown in FIG. 11, the left end of the ghost information bar 105 indicates 0 second, and the right end of the ghost information bar 105 indicates 10 seconds.) Moreover, a silhouette image 109, which corresponds to a current posture of the ghost 104 seen from the side thereof, is shown in a two-dimensional image as the current icon 106.

Figure 12:
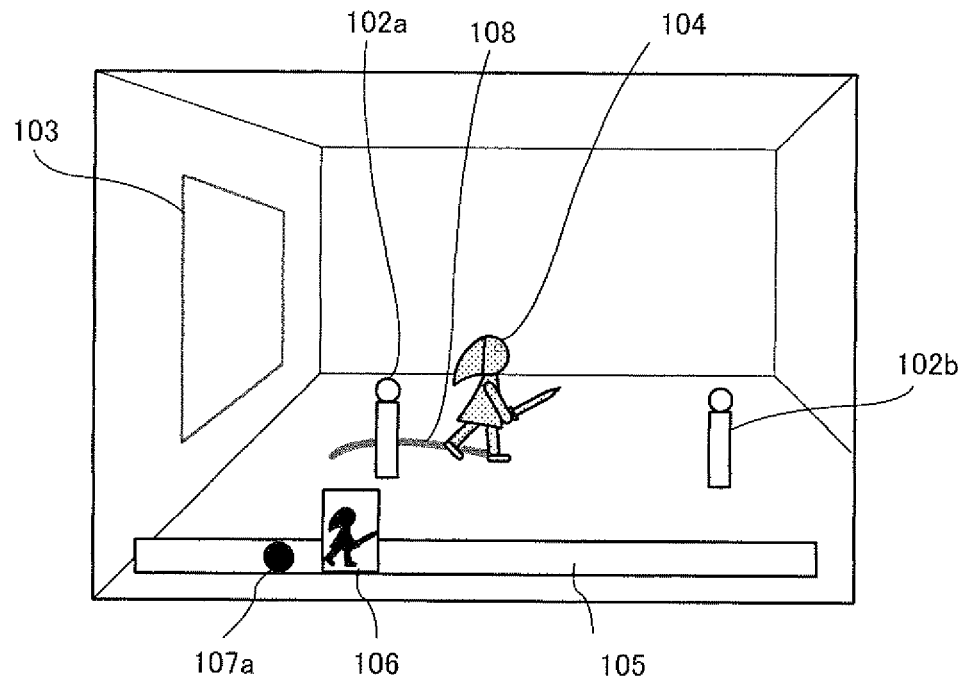
FIG. 12 is an exemplary game screen assumed in the present embodiment.
Figure 13:
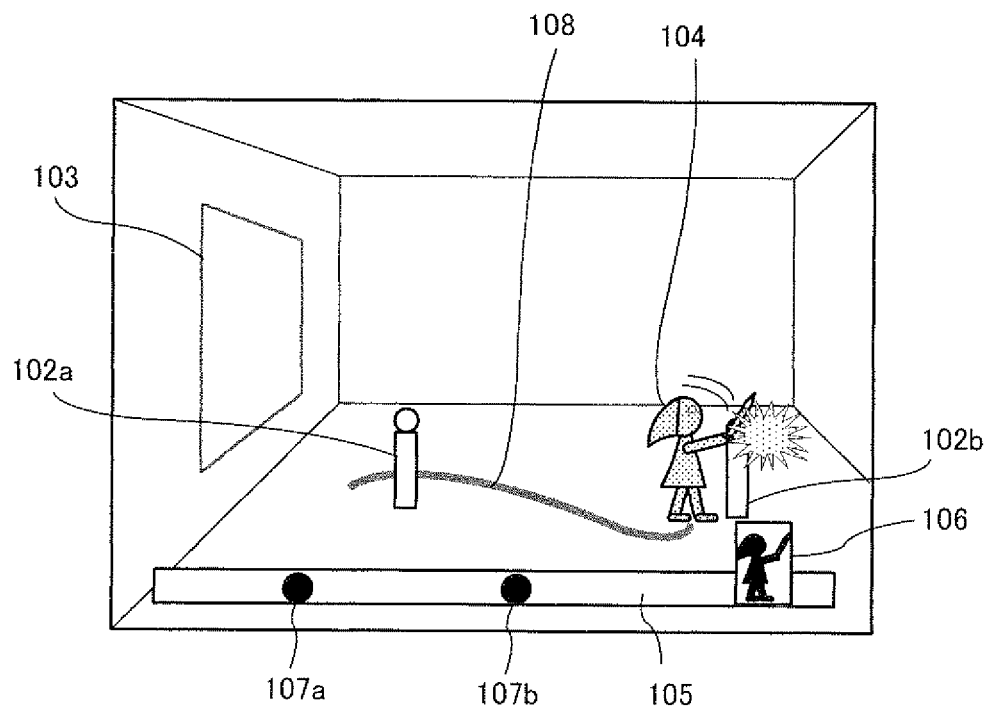
FIG. 13 is an exemplary game screen assumed in the present embodiment.

Once the ghost 104 appears (that is, once the ghost recording mode is started), the player controls the ghost 104 so as to cause the ghost 104 to perform a desired action. FIG. 12 and FIG. 13 show how the ghost 104 is controlled to turn on the switch 102b. While the ghost 104 is being controlled, the silhouette image 109 is updated in real time in accordance with the posture of the ghost 104. Further, when the ghost 104 is caused to perform a predetermined action, such as jumping, swinging a sword, lifting a box (which is on the floor), throwing a thing, and stepping on a switch on the floor, other than moving, an action marker 107 (collectively representing below-described action markers 107a to 107c) for indicating that the predetermined action has been performed is displayed on the ghost information bar 105. In the example shown in FIG. 12, circle-shaped action markers 107a and 107b are displayed. Here, each circle-shaped action marker indicates that an action of jumping has been performed. Further, as shown in FIG. 13, the ghost 104 has swung a sword to turn on the switch 102. The action of swinging the sword is indicated by a star-shaped action marker (an action marker 107c described below). As shown in FIG. 13, the ghost 104 has just swung the sword, and thus a star-shaped action marker is to be displayed in the position where the current icon 106 is being displayed. However, in FIG. 13, the star-shaped action marker cannot be seen because the star-shaped action marker is obscured by the current icon 106. Then, as described above, data representing a series of operation histories about the ghost 104 (data representing, for example, when and which button has been pressed, that is, key data during the time when the ghost is being controlled) is stored in the external main memory 12 as ghost operation data. Moreover, in accordance with the control of the ghost 104, a moving path 108 of the ghost 104 is generated to be displayed. In the examples shown in FIG. 12 and FIG. 13, the moving path 108 is shown in the form of a line. Alternatively, the moving path 108 may be shown in the form of "footprints".

Figure 14:
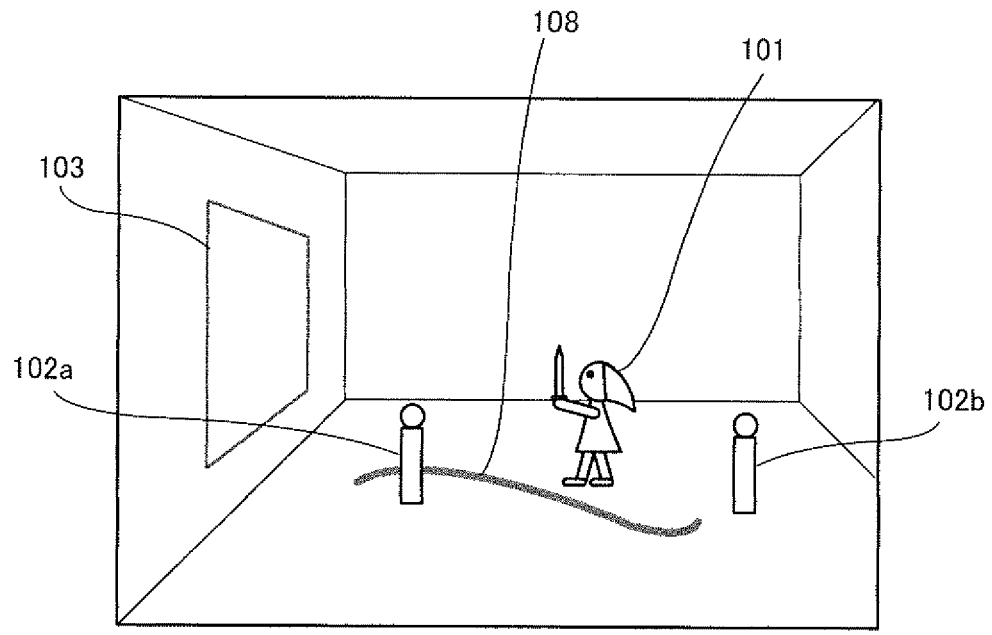
FIG. 14 is an exemplary game screen assumed in the present embodiment.

When 10 seconds have passed after the appearance of the ghost 104, the ghost 104 is no longer displayed, and the ghost recording mode is ended. As a result, as shown in FIG. 14, the player object 101 is displayed again, and the state of the virtual game space returns to that before the ghost shot is performed. Note that, as shown in FIG. 14, the moving path 108 is still displayed. Then, the progress of time, which has been suspended since the appearance of the ghost 104, is resumed in the virtual game space.

Figure 15:
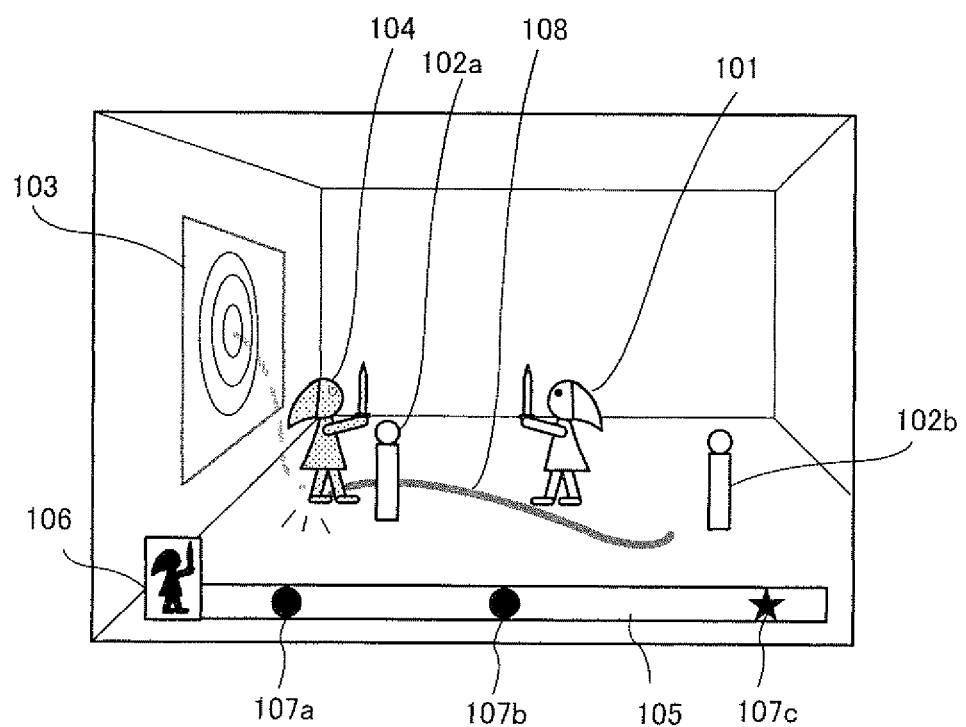
FIG. 15 is an exemplary game screen assumed in the present embodiment.

Next, reproduction of the action of the ghost is described. In the state shown in FIG. 14, when the player performs an operation (pressing a predetermined button, and the like) to reproduce the action of the ghost, the ghost 104 appears from the mirror 103, as shown in FIG. 15. At this time, the ghost information bar 105 is also displayed. That is, during the reproduction of the action of the ghost, the ghost information bar 105 is displayed to present, to the player, information about the action of the ghost 104. In FIG. 15, three action markers 107a, 107b, and 107c are displayed on the ghost information bar 105'. The rightmost action marker 107c is indicative of the action of swinging the sword. Moreover, since the state shown in FIG. 15 is the one where the ghost 104 has just appeared, the current icon 106 is displayed at the left end of the ghost information bar 105. During the time when the action of the ghost is being reproduced, the current icon 106 specifies a current time point in the reproduction.

Figure 16:
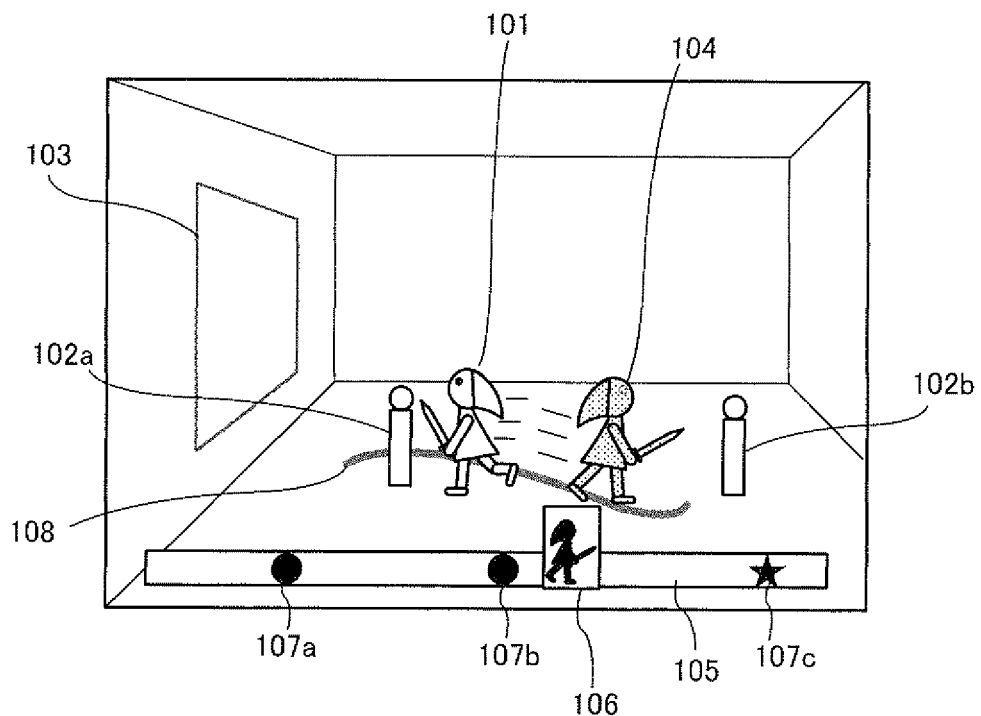
FIG. 16 is an exemplary game screen assumed in the present embodiment.
Figure 17:
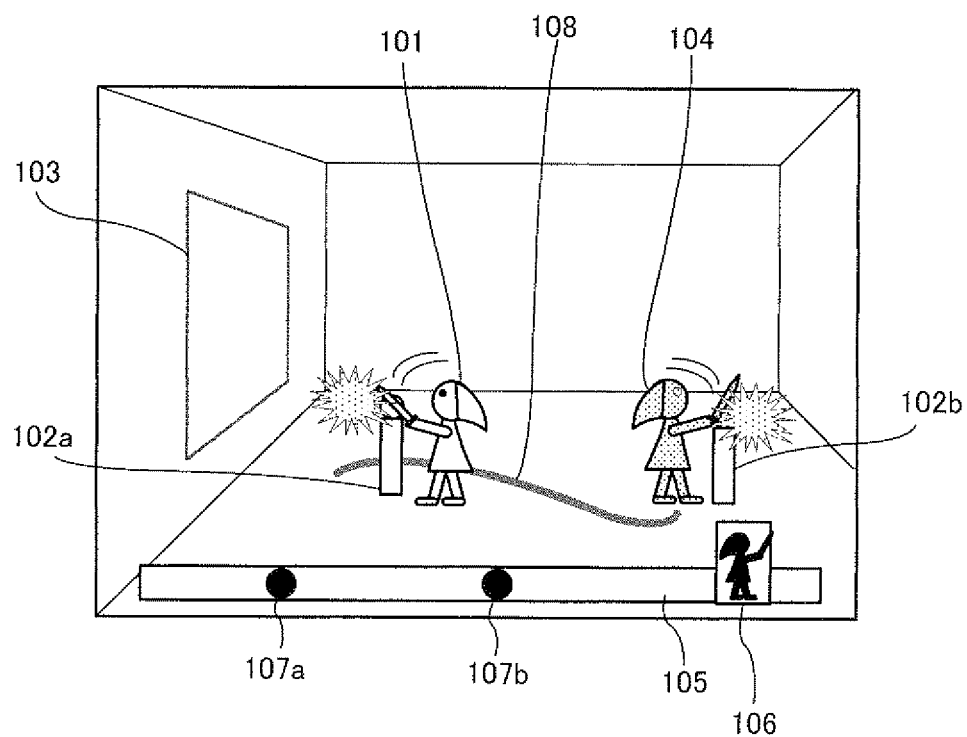
FIG. 17 is an exemplary game screen assumed in the present embodiment.

Subsequently, as shown in FIG. 16, the action of the ghost 104 is reproduced in accordance with the ghost operation data (accordingly, the ghost 104 moves along the moving path 108). Moreover, the current icon 106 also moves to the right as a function of time. Since the action of turning on the switch 102b is performed in the example described above, the action of turning on the switch 102b is reproduced as the action of the ghost 104. Here, since the action marker 107 is displayed on the ghost information bar 105, the player is able to know in advance the timing (for example, timing of swinging the sword) of the action to be performed by the ghost 104. In the example shown in FIG. 16, since the action marker 107c indicating that the action of swinging the sword is to be performed is displayed near the right end of the ghost information bar 105, it is possible to know in advance that the ghost 104 is going to swing the sword when the position of the current icon 106 coincides with the position of the action marker 107c. As a result, as shown in FIG. 17, if the player performs an operation to cause the player object 101 to turn on the switch 102a (operation to cause the player object to swing the sword) at the timing when the position of the current icon 106 coincides with the position of the action marker 107c, both the switch 102a and the switch 102b can be turned on simultaneously.

Note that, in this game, it is also possible to cancel the reproduction of the action of the ghost in the middle of the reproduction, by performing a predetermined operation during the reproduction. The recorded data of the ghost will remain recorded unless the player performs an operation to provide an instruction to delete the recorded data. That is, reproduction of the action of the ghost can be executed any number of times.

Figure 18:
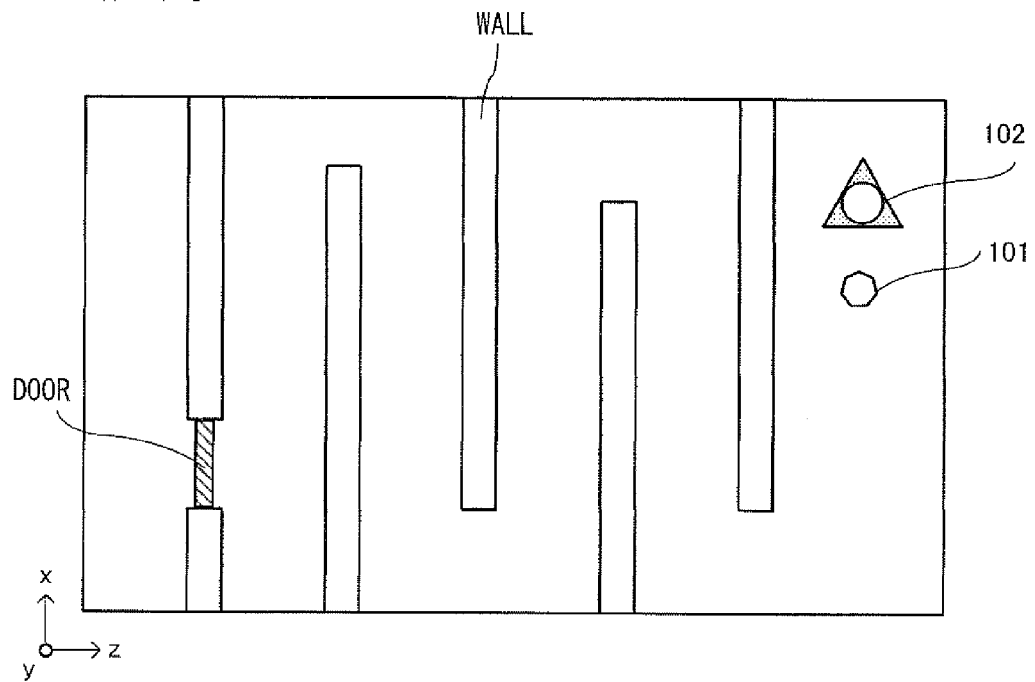
FIG. 18 is a schematic bird's eye view of a game space assumed in the present embodiment.
Figure 19:
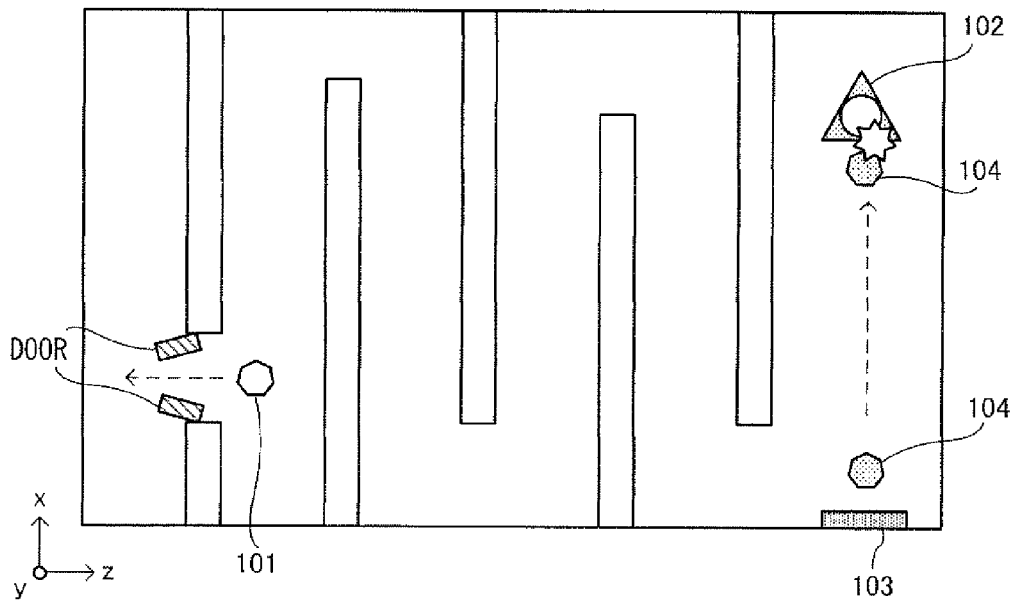
FIG. 19 is a schematic bird's eye view of a game space assumed in the present embodiment.

As described above, in this game, during the reproduction of the action of the ghost 104, the information about the action of the ghost 104 is indicated in the form of the ghost information bar 105, the current icon 106, and the action marker 107. This allows the player to know in advance the movement of the ghost 104, thereby enabling a smooth cooperation play between the ghost 104 and the player, thus enhancing the entertaining feature of the game. Note that during the reproduction of the action of the ghost 104, even in a case where the information about the action of the ghost 104 is indicated in the form of the current icon 106 and the action marker 107, it is possible to know the positional relation between the current icon 106 and the action marker 107 on the screen, thereby allowing the player to know an approximate time period from the current time to the time when a predetermined action is to be performed. As a cooperation play, the following can be considered in addition to "simultaneously turning on two switches" as described above. For example, as shown in FIG. 18, which is a schematic bird's eye view of the virtual game space, a switch 102 for opening a door is located away from the door. The door is opened when the switch 102 is turned on. However, the door remains open only for a very short time period. Thus, a case is assumed where after the switch 102 is turned on to open the door, it is impossible for the player object 101 to move from the switch 102 to the door while the door is open. In such a case, for example, the mirror 103 is caused to appear in front of the switch 102, so as to cause the ghost 104 to perform an action of turning on the switch 102. As shown in FIG. 19, in a state where the player object 101 is in front of the door, the player performs an operation to reproduce the action of the ghost 104. As a result, the ghost 104 appears out of the mirror 103 and turns on the switch 102, thereby opening the door. At this time, as described above, the timing at which the ghost 104 turns on the switch 102, that is, the timing of swinging the sword, is indicated by the action marker 107 on the ghost information bar 105, allowing the player to know more precisely and more easily the timing of the door to be opened. Then, the player controls the player object 101 at that timing, so as to allow the player object 101 to pass through the door before the door is closed.

Figure 20:
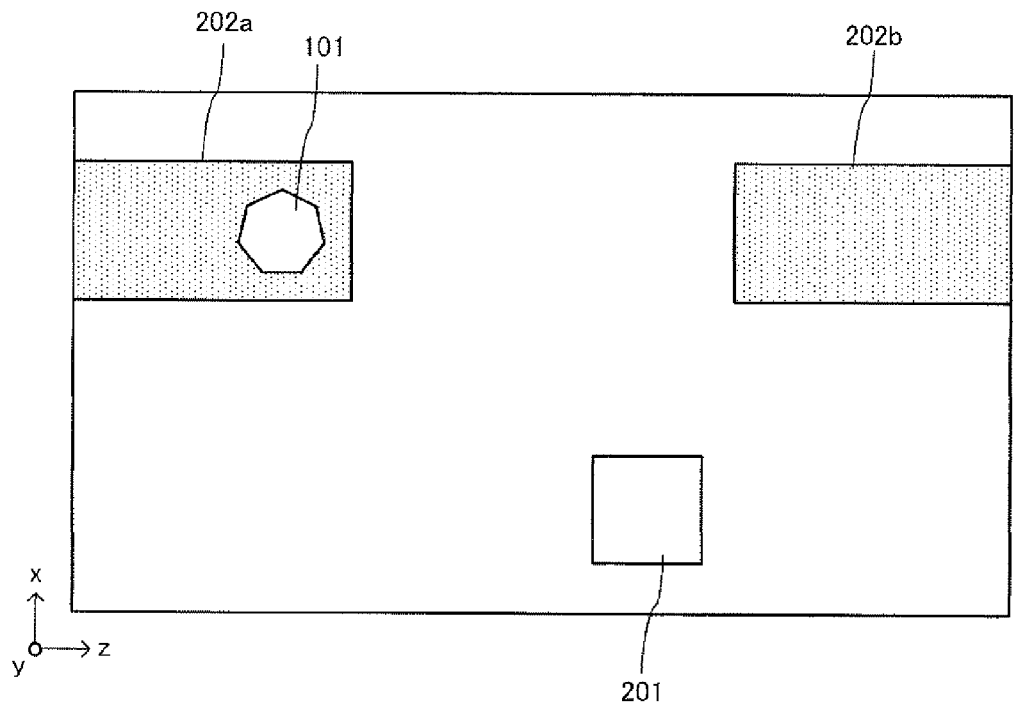
FIG. 20 is a schematic bird's eye view of a game space assumed in the present embodiment.
Figure 21:
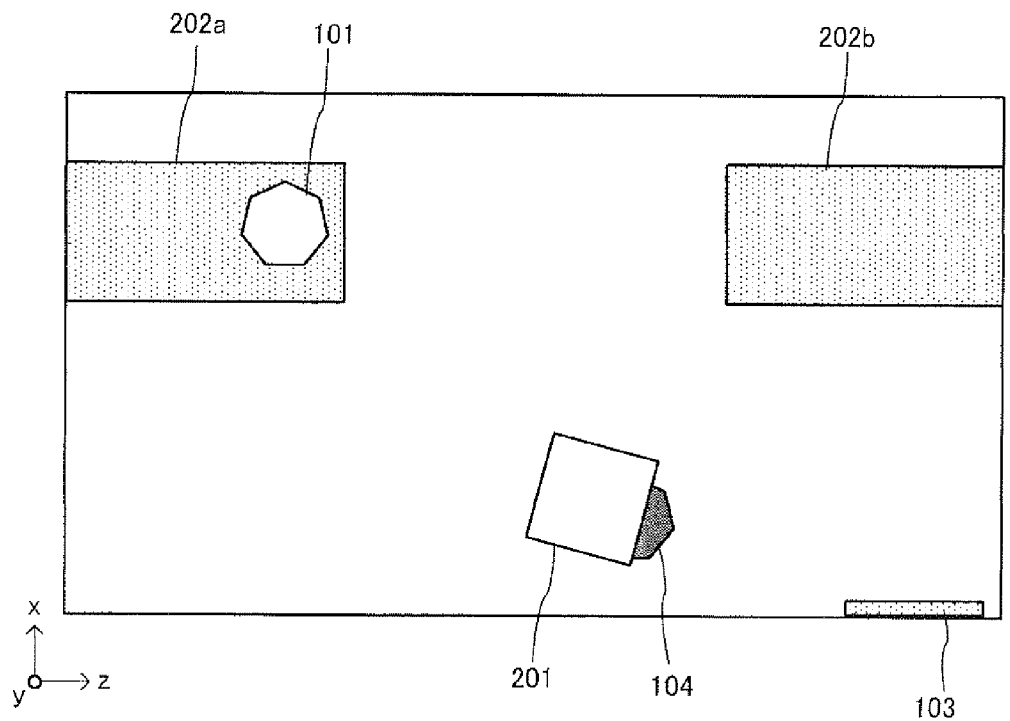
FIG. 21 is a schematic bird's eye view of a game space assumed in the present embodiment.
Figure 22:
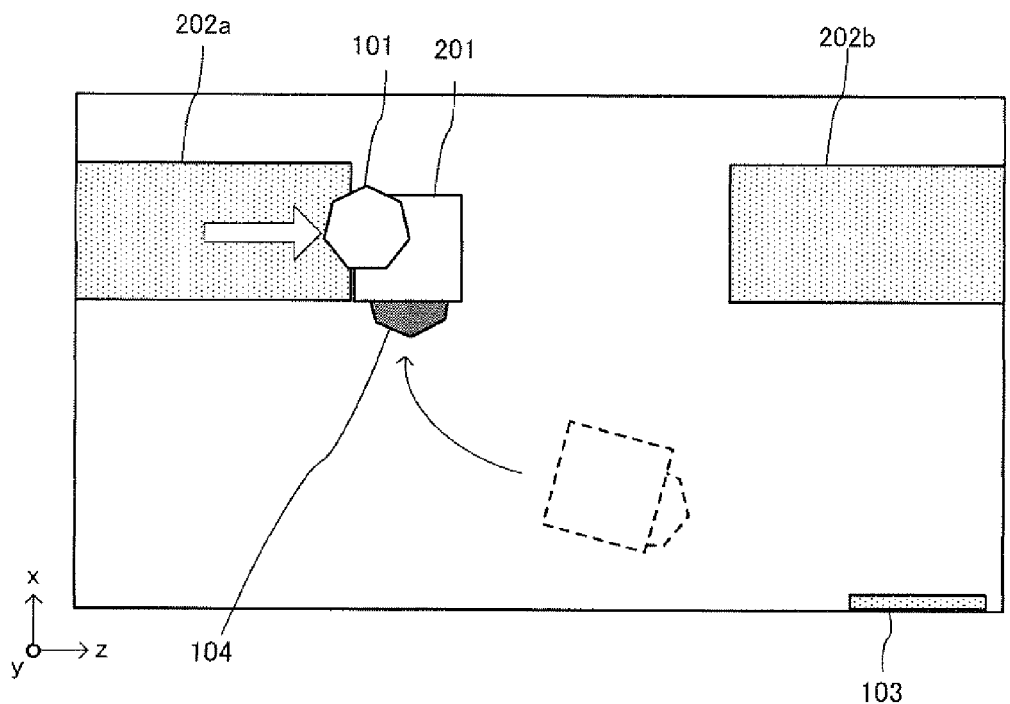
FIG. 22 is a schematic bird's eye view of a game space assumed in the present embodiment.
Figure 23:
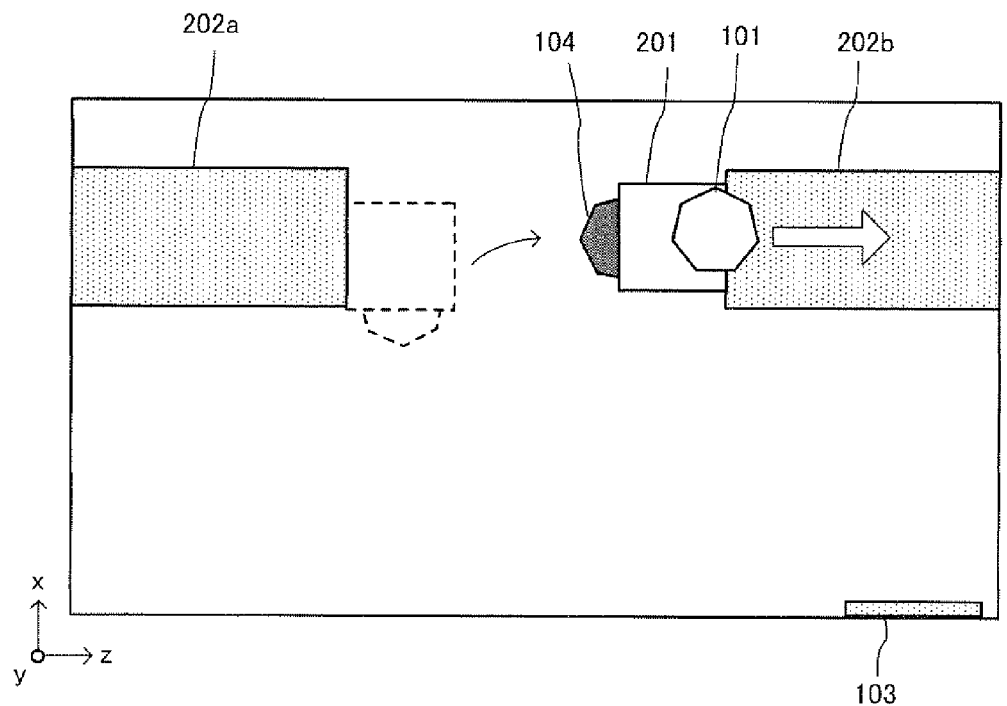
FIG. 23 is a schematic bird's eye view of a game space assumed in the present embodiment.

In addition, for example, it is conceivable that the ghost 104 may be used as a moving footing. FIG. 20 is a schematic bird's eye view of the virtual game space. As shown in FIG. 20, footings 202a and 202b are provided at a predetermined height from the floor and the player object 101 is on the footing 202a. The gap between the footings 202a and 202b has a distance which cannot be jumped over. Meanwhile, there is a box 201 on the floor. In such a case, the ghost 104 is caused to perform an action of lifting the box 201 onto the head thereof (such that the top surface of the lifted box 201 is leveled to the same height as the top surface of the footings 202a and 202b) and moving from an end of the footing 202a to an end of 202b, while the action is being recorded. Then, in a state where the player object 101 is at the end of the footing 202a, when the player performs an operation to reproduce the action of the ghost 104, the ghost 104 lifts the box 201, as shown in FIG. 21, and moves to the end of the footing 202a, as shown in FIG. 22. At that timing, the player causes the player object 101 to move onto the box 201. Subsequently, the ghost 104 moves to the end of the footing 202b, as shown in FIG. 23. At that timing, the player object 101 is caused to move from the box 201 onto the footing 202b. In this manner, it is possible to cause the player object 101 to move from the footing 202a to 202b. Further, as described above, with regard to the action of the ghost, since the information is indicated on the ghost information bar 105, it is possible for the player to know more easily the timing at which to cause the player object 101 to move.

As another example of a cooperation play, for example, it is conceivable that two enemy objects are caused to perform simultaneous attacks. In this case as well, since the timing at which the ghost 104 is to swing a sword is indicated by the action marker 107 on the ghost information bar 105, it is possible for the player to easily know the timing at which the simultaneous attacks are to be performed. Further, in addition to this, there may be considered a play in which the ghost 104 is used as a "decoy". In other words, the player performs an operation to cause the ghost 104 to appear, move towards a predetermined enemy object, and swing a sword, while the action is being recorded. Here, in setting a target for the enemy object to attack, the player object or the ghost, whichever approaches the enemy object first, is set in advance as the target to be attacked by the enemy object, and the enemy object performs an action (moving and the like) of attacking the set target. Then, in a state where the player object 101 is away from the enemy object, when an operation to reproduce the action of the ghost 104 is performed, the ghost 104 approaches the enemy object, and the enemy object starts the action of attacking the ghost 104 which is approaching the enemy object. During this while, the player object 101 can be, for example, caused to go behind the enemy object so as to attack the enemy object from behind. In such a case as well, information about the series of the actions of the ghost is indicated on the ghost information bar 105, thereby enabling the player to easily know the timing at which the player is to control the player object 101.

As described above, in this game, information about the various actions performed by the ghost 104 and the timings at which predetermined actions are performed are indicated on the ghost information bar 105. This allows the player to know in advance what action the ghost 104 is going to perform. Accordingly, a smooth cooperation play between the player object 101 and the ghost 104 is realized, thereby enhancing the entertaining feature of the game.

Next, game processing executed by the game apparatus body 3 will be described in detail. Initially, data which is to be stored in the external main memory 12 in the game processing will be described. FIG. 24 is a diagram illustrating a memory map of the external main memory 12 of the game apparatus body 3. In FIG. 24, the external main memory 12 includes a program storage area 121 and a data storage area 125. Data of the program storage area 121 and of the data storage area 125 is stored in the optical disc 4, and the data is transferred to be stored in to the external main memory 12 when a game program is executed.

The program storage area 121 stores a game program executed by the CPU 10, and the game program includes a main process program 122, a ghost recording process program 123, a ghost reproduction process program 124, and the like.

The main process program 122 is a program corresponding to processing shown in a flow chart of FIG. 26 described below. The ghost recording process program 123 is a program for causing the CPU 10 to execute the processing for recording the control of the ghost 104 as described with respect to FIG. 11 and the like. The ghost reproduction process program 124 is a program for causing the CPU 10 to execute the processing for reproducing the action of the ghost 104 as described with respect to FIG. 15 and the like.

In the data storage area 125, data such as operation data 126, ghost data 130, object data 135 are stored, and various flags used in the game processing are also stored.

The operation data 126 is transmitted from the controller 7 to the game apparatus body 3. As described above, since the operation data is transmitted to the game apparatus body 3 once every $1/200$ sec. from the controller 7, the operation data 126 stored in the external main memory 12 is updated at this rate. In the present embodiment, only the latest (most recently obtained) operation data may be stored in the external main memory 12.

The operation data 126 includes operation button data 127, acceleration data 128, and marker coordinate data 129. The operation button data 127 represents the input state of each of the operation buttons 72a to 72i. FIG. 25 is a diagram illustrating an exemplary structure of the operation button data 127. The operation button data 127 includes data representing the button type 1271 and the state of button 1272. The button type 1271 represents the type of each button in the operation section 72. The state of button 1272 represents whether or not the corresponding button is pressed (ON/OFF state), and "0" denotes a state where the button is not pressed (OFF state) and "1" denotes a state where the button is pressed (ON state).

The acceleration data 128 represents acceleration (acceleration vector) detected by the acceleration sensor 701. Here, the acceleration data 128 represents a three-dimensional acceleration vector containing acceleration components along the three x-, y-, and z-axis directions shown in FIG. 3.

The marker coordinate data 129 represents coordinates calculated by the image processing circuit 744 in the imaging information calculation section 74, that is, marker coordinates. The marker coordinates are represented in a two-dimensional coordinate system for representing a position, on a plane, corresponding to a picked up image. In a case where an image of the two markers 8R and 8L is picked up by the image pickup element 743, two sets of marker coordinates are calculated. Meanwhile, in a case where one of the markers 8R and 8L is not located within the area in which an image is picked up by the image pickup element 743, an image of only one marker present in the area is picked up by the image pickup element 743, and thus only one set of marker coordinates is calculated. Further, in a case where neither of the markers 8R and 8L are located within the area in which an image is picked up by the image pickup element 743, no image of the markers is picked up by the image pickup element 743, and thus no marker coordinates are calculated. Accordingly, the marker coordinate data 129 may represent two sets of marker coordinates, one set of marker coordinates, or no marker coordinates.

With reference back to FIG. 24, the ghost data 130 is recorded data of, for example, the operations performed onto the ghost 104, and thus representing the action of the ghost 104. The ghost data 130 includes first frame data 1311, second frame data 1312, . . . nth frame data (n is a natural number equal to or larger than 1), each of which is a piece of data of the action (action corresponding to a maximum of 10 seconds in the example described above) performed by the ghost 104 and corresponds to one frame ($1/30$ seconds in the present embodiment). Note that these pieces of data are stored in order of time (that is, data stored in sequential organization). Data of each frame includes ghost operation data 132, silhouette image data 133, and action marker data 134. The ghost operation data 132 represents the operation performed onto the ghost 104 by the player. The structure of the ghost operation data 132 is the same as that of the operation button data 127. The silhouette image data 133 represents a silhouette image 109 as shown in FIG. 11. The action marker data 134 is information about the action marker 107 shown in FIG. 15 and the like. Specifically, the action marker data 134 contains information indicating presence or absence of the action marker in the corresponding frame, and information indicating the content thereof (in the example shown in FIG. 15, information indicating, e.g., whether the action marker is a circle-shaped action marker 107a or a star-shaped action marker 107c, or alternatively, the image data of the action marker 107).

The object data 135 contains data of various objects (a player object, an enemy object, an item object, a topography object and the like) which appear in the virtual game space.

Figure 26:
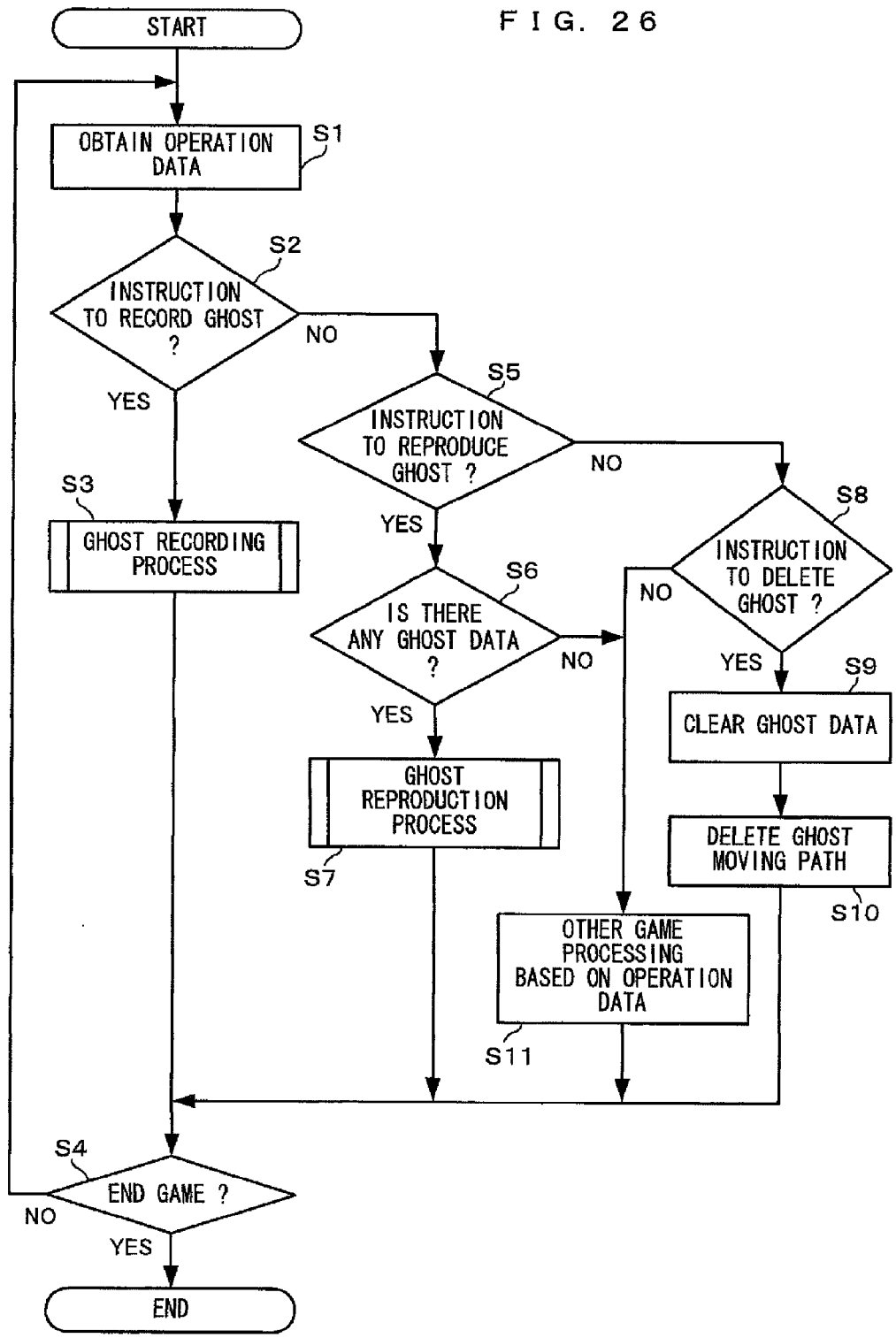
FIG. 26 is a flow chart showing game processing according to the embodiment of the present invention.
Figure 27:
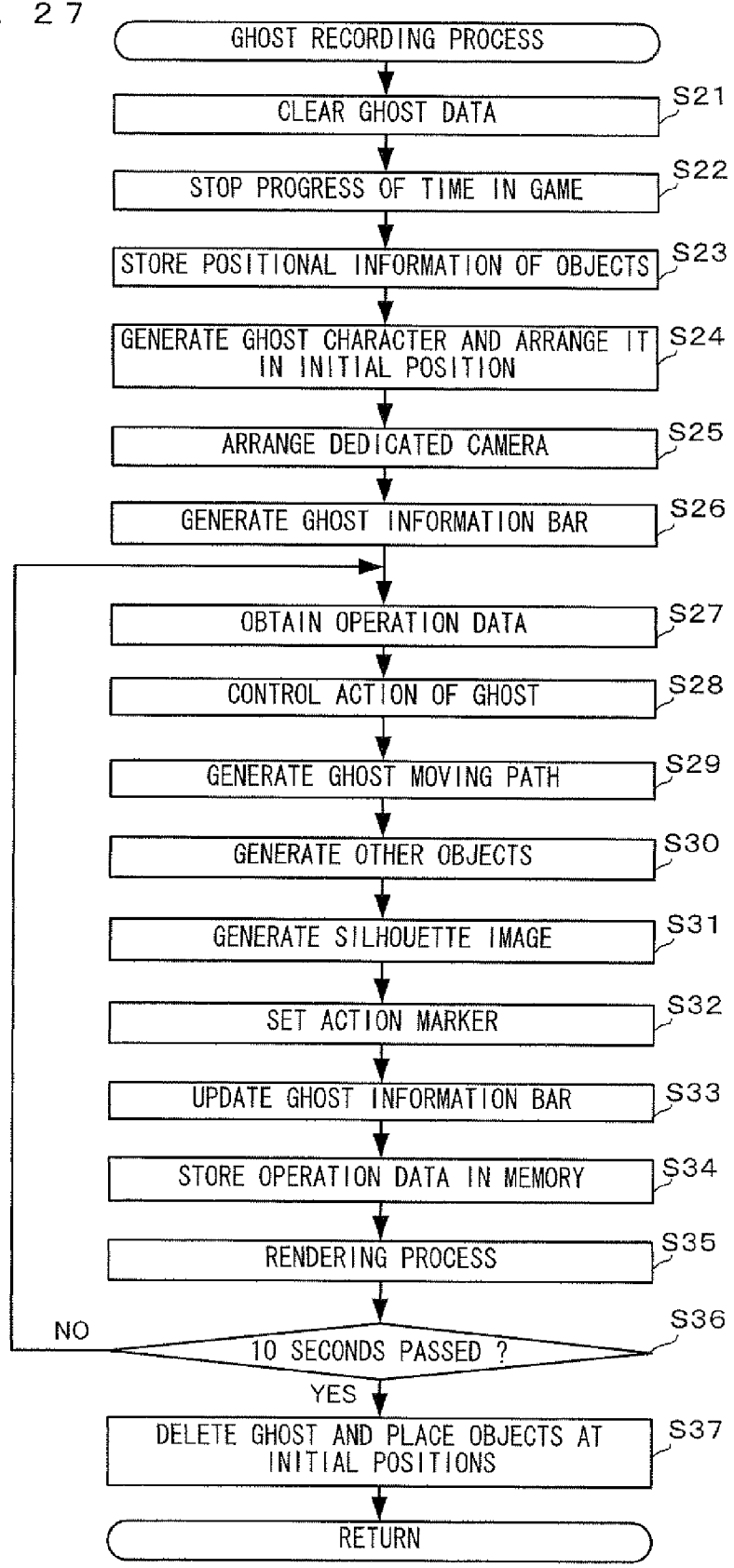
FIG. 27 is a flow chart showing in detail a ghost recording process of step S3 shown in FIG. 26.
Figure 28:
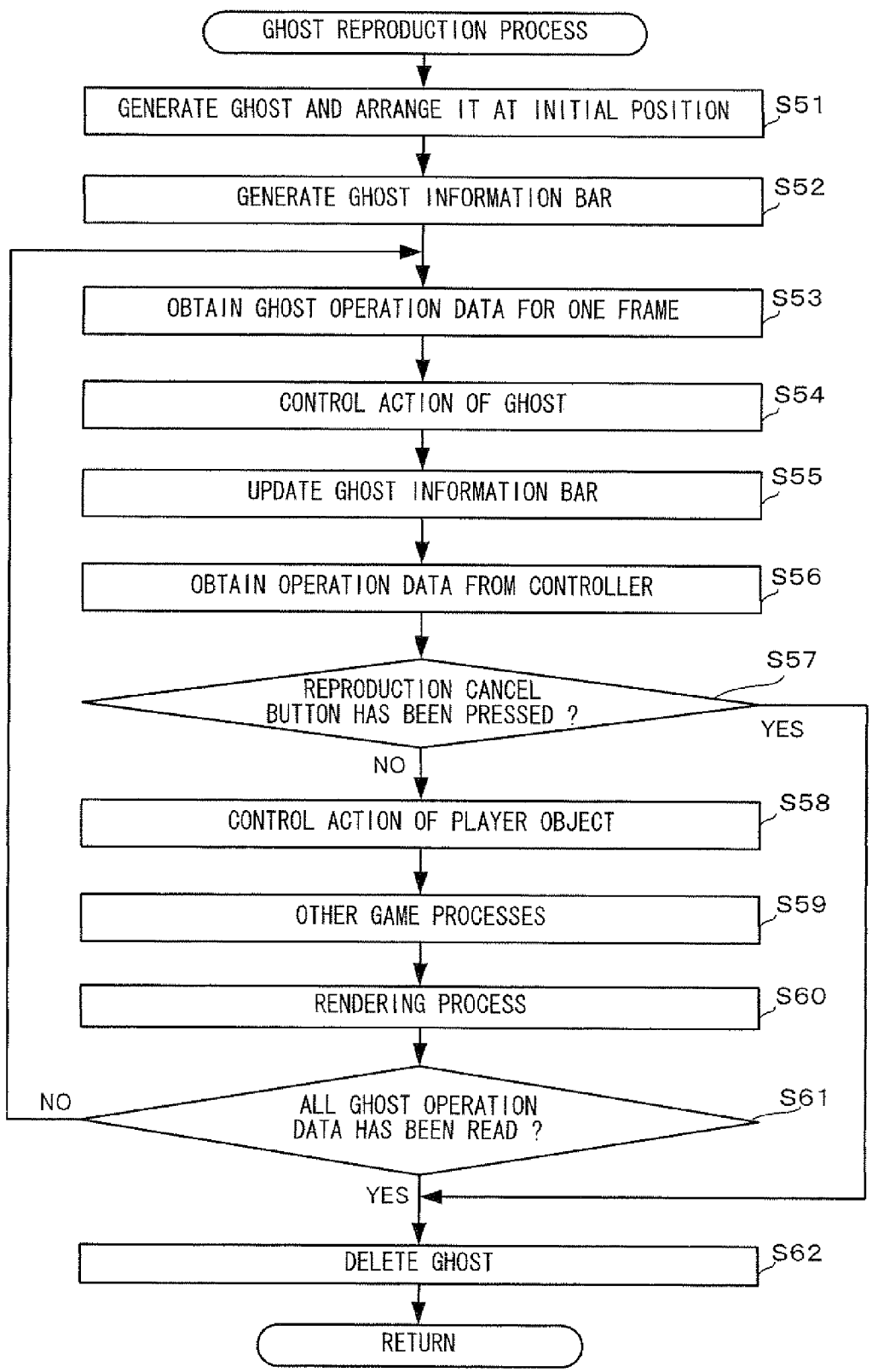
FIG. 28 is a flow chart showing in detail a ghost reproduction process of step S7 shown in FIG. 26.

Next, with reference to FIG. 26 to FIG. 28, the game processing executed by the game apparatus body 3 is described. When the game apparatus body 3 is powered on, the CPU 10 of the game apparatus body 3 executes a boot program stored in the ROM/RTC 13, so as to initialize the respective units such as the external main memory 12. The game program stored in the optical disc 4 is loaded to the external main memory 12, and the CPU 10 starts to execute the game program. The flow chart shown in FIG. 26 is a flow chart showing game processing performed after the process described above is completed. Moreover, FIG. 27 is a sub-routine showing, in detail, operations of a ghost recording process (step S3) of FIG. 26, and FIG. 28 is a sub-routine showing, in detail, operations of a ghost reproduction process (step S7) of FIG. 26. Moreover, the process loop of step S1 to step S11 shown in FIG. 26, the process loop of step S27 to step S37 shown in FIG. 27, and the process loop of step S53 to step S61 shown in FIG. 28 are repeatedly performed in each frame.

In FIG. 26, first, the CPU 10 obtains the operation data 126 from the external main memory 12 (step S1). Next, the CPU 10 determines whether or not the operation performed by the player, which is represented by the operation data 126, is an instruction to record actions of the ghost (step S2). In the example described above, it is determined whether or not the operation is the "ghost shot." When it is determined that the operation is the instruction to record actions of the ghost (YES at step S2), the CPU 10 executes the ghost recording process for recording the operation performed onto the ghost 104 by the player (step S3).

FIG. 27 is a flow chart showing in detail the ghost recording process of step S3. In FIG. 27, the CPU 10 executes various initialization processes first. Specifically, the CPU 10 clears the ghost data 130 first (step S21). Next, the CPU 10 stops the progress of time in the virtual game space (step S22). Next, the state of the virtual game space at this time, specifically, positional information about the player object 101, the enemy object, and the item object (for example, the box 201 in FIG. 20), is stored in the external main memory 12 (step S23).

Figure 29:
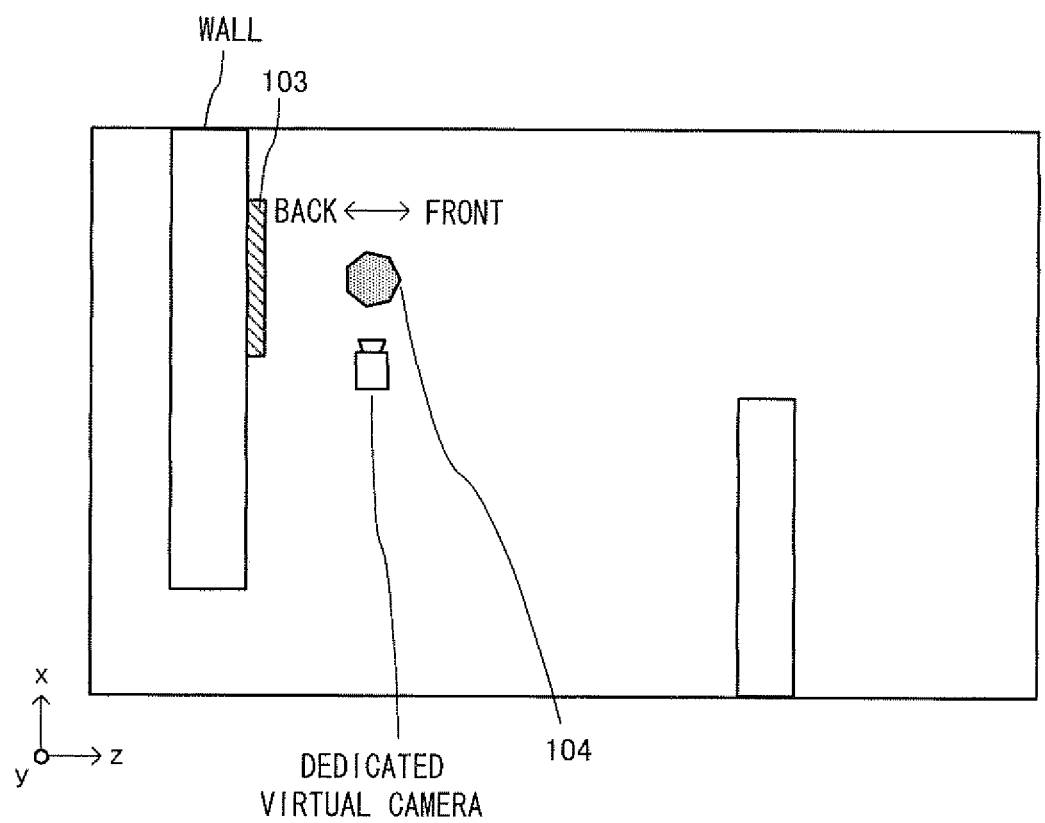
FIG. 29 is a diagram illustrating an arrangement of a dedicated camera.

Next, the ghost 104 is generated and caused to perform an action of appearing out of the mirror 103, and then arranged in a predetermined initial position (for example, below the mirror 103) (step S24). Next, the CPU 10 arranges a dedicated virtual camera for generating a silhouette image described above in a position to the right of the ghost 104 (step S25, and see FIG. 29). The dedicated camera is moved in accordance with the movement of the ghost 104, with the position to the right of the ghost 104 maintained. A silhouette image 109 described above is generated based on the posture of the ghost 104 in an image taken by the dedicated camera.

Next, the CPU 10 generates a ghost information bar 105 and arranges the ghost information bar 105 in a predetermined position (in a lower part of the screen in the present embodiment) on the game screen (step S26). At this time, the CPU 10 starts counting time. This is the end of the initialization process for the ghost recording process.

Next, the CPU 10 obtains the operation data 126 (step S27). Next, the CPU 10 controls the action of the ghost 104, in accordance with the operation data 126 (step S28).

Next, the CPU 10 generates a moving path 108 of the ghost 104 as shown in FIG. 13 and the like (step S29). Subsequently, the CPU 10 controls an object other than the ghost, based on the action of the ghost 104 which has been controlled at step S28 (step S30). For example, when the ghost 104 performs an action of lifting a box object, the positional information of the box object and the like is changed as appropriate such that the box object is lifted.

Next, the CPU 10 generates the silhouette image 109 (step S31). In other words, an image of a side of the ghost 104 is taken by the dedicated camera, and process of blacking out the image is performed, thereby generating a silhouette image 109 to be stored as silhouette image data 133.

Next, the CPU 10 performs setting of an action marker 107 (step S32). The process of step S32 is more specifically described. First, the CPU 10 determines, based on the operation data 126, whether or not an action other than a "movement" has been instructed. For example, it is determined whether or not a button other than the cross key 72a has been pressed. As a result, in a case where an action other than a "movement" has been performed, the kind of action corresponding to the operated button is determined. In other words, it is determined whether or not the operation is for an action of jumping or an action of swinging a sword, or the like. Then, information indicating the image of the action marker 107 (image data, or Information indicating a link to the image data of the action marker, or the like) is generated in accordance with the action, to be stored as action marker data 134. Note that, in a case where the operation is for an instruction to move, data is not set as the action marker data 134 (alternatively, information showing that no action other than a movement has been performed may be stored).

Next, the CPU 0 executes update of the ghost information bar 105 (step S33). To be specific, a current icon 106 is generated based on the silhouette image data 133. Then, the current icon 106 is displayed on the ghost information bar 105 at a position indicating the elapsed time since the appearance of the ghost. Moreover, when an action marker 107 is generated, the action marker 107 is also displayed on the ghost information bar 105.

Next, the operation data 126 obtained at step S27 is stored in the external main memory 12 as ghost operation data 132 (step S34).

Next, the CPU 10 executes a rendering process (step S35) In other words, executed is processing for displaying, as a game image, on the television 2, an image of the virtual game space taken by the virtual camera. In the rendering process, a moving path 108 is displayed on the television 2. However, the timing as which the moving path 108 is displayed is not limited thereto, and the moving path 108 may be displayed after step S36 described later, or may be displayed at a time of the rendering process at step S60, which is a ghost reproduction process described later.

Subsequently, the CPU 10 determines whether or not a predetermined time period, 10 seconds in the present embodiment, has passed since the appearance of the ghost (step S36). Specifically, the CPU 10 determines whether or not the time which has been counted since step S26 is 10 seconds. As a result, in a case where the predetermined time period has not passed (NO at step S36), the processing is returned to step S27 and the CPU 10 repeats the processing. On the other hand, in a case where 10 seconds have passed (YES at step S36), the CPU 10 deletes the ghost 104 and resets the state of the virtual game space to the state before the appearance of the ghost, in accordance with the positional information about objects stored at step S23. Furthermore, the progress of time in the virtual game space which has been suspended since step S22 is resumed (step S37). This is the end of the ghost recording process.

With reference back to FIG. 26, after the ghost recording process is ended, the CPU 10 next determines whether or not a game ending condition is satisfied (for example, presence or absence of an instruction to end the game) (step S4). In a case where the game is not to be ended (NO at step S4), the processing is returned to step S1, and the CPU 10 repeats the processing. In a case where the game is to be ended (YES at step S4), the CPU 10 ends the game processing.

Next described is processing to be performed in a case where it is determined, at step S2, that an instruction to record the ghost has not been provided (NO at step S2). In this case, first, the CPU 10 determines whether or not the operation represented by the operation data is an instruction to reproduce the action of the ghost (step S5). As a result, in a case where the operation represented by the operation data is the instruction to reproduce the action of the ghost (YES at step S5), the CPU 10 subsequently determines whether or not ghost data 130 is present (blank or not) (step S6). In other words, the CPU 10 determines whether or not reproducible ghost data 130 is stored. When it is determined that the ghost data 130 is blank (NO at step S6), the CPU 10 proceeds to a process of step S11 described below. On the other hand, when it is determined that the ghost data 130 is present (YES at step S6), the CPU 10 executes a ghost reproduction process in accordance with the ghost data 130 (step S7).

FIG. 28 is a flow chart showing in detail the ghost reproduction process of step S7. As shown in FIG. 28, first, the CPU 10 generates the ghost 104, causes the ghost 104 to perform an action such as coming out of the mirror 103 (note that, when the player object 101 is away from the mirror 103, there may be a case where such an action of the ghost 104 is not displayed on the screen), and arranges the ghost 104 at a predetermined initial position (below the mirror 103 in the present embodiment) (step S51).

Next, the CPU 10 generates a ghost information bar 105 (step S52). More specifically, the CPU 10 reads the ghost data 130, and further obtains action marker data 134 of each frame contained in the ghost data 130. Then, the CPU 10 generates the ghost information bar 105, and generates action markers 107 to be displayed on the ghost information bar 105, at positions each corresponding to a time point where action marker data, if any, is set.

Next, the CPU 10 obtains the ghost operation data 132 of one frame (step S53). Note that, since the ghost data 130 of each frame is stored in order of time as described above, sequential reading of the ghost data 130 allows data of the first frame and thereafter to be read sequentially.

Next, the CPU 10 controls the action of the ghost 104, in accordance with the read ghost operation data 132 of the one frame as described above (step S54).

Next, the CPU 10 updates the ghost information bar 105 (step S55). Specifically, the CPU 10 obtains the silhouette image data 133 and generates a current icon 106 based thereon to be displayed on the ghost information bar 105. The position at which the current icon 106 is to be displayed is a position corresponding to the elapsed time at which the corresponding ghost operation data is recorded in the ghost recording mode. For example, in the case of the ghost operation data of the first frame, the position is at the leftmost. The position is shifted toward the right in accordance with an increase in the frame number (that is, the current icon 106 is moved to the right on the ghost information bar 105 as a function of time). Note that the CPU 10 may update the ghost information bar at a timing at which the rendering process of step S60 described below is performed.

Next, the CPU 10 obtains the operation data 126 (step S56). In other words, the CPU 10 obtains the operation performed by the player. Next, the CPU 10 determines whether or not the operation represented by the operation data 126 is an instruction to cancel the reproduction of the action of the ghost (step S57). As a result of the determination, in a case where the operation represented by the operation data 126 is an instruction to cancel the reproduction (YES at step S57), the processing proceeds to step S62 described blow. On the other hand, in a case where the operation represented by the operation data 126 is not an instruction to cancel the reproduction (NO at step S57), the CPU 10 performs control of the action of the player object 101, in accordance with the operation data 126 (step S58).

Next, the CPU 10 executes other game processes (step S59). In other words, the CPU 10 executes processing to apply, to the game space, results of the actions of the player object 101 and the ghost 104. For example, as shown in FIG. 17, when the player object 101 and/or the ghost 104 swing a sword, a hit determination process is executed. Furthermore, when it is determined, as a result of the hit determination process, that the swords have hit the switches and both of the switches have been simultaneously turned on as shown in FIG. 17, a process for opening the "door" is executed. Here, the determination that both of the switches have been simultaneously turned on is provided in a case where both of the switches have been turned on within a predetermined number of frames, as well as in a case where both of the switches have been turned on in one frame.

Next, the CPU 10 executes a rendering process (step S60) To be specific, the CPU 10 executes a process for displaying, as a game image, on the television 2, an image of the virtual game space taken by the virtual camera.

Next, the CPU 10 determines whether or not all the data of the frames contained in the ghost data 130 (that is, data corresponding to 10 seconds) has been read and processed (step S61). As a result of the determination, when all the data has not been processed yet (NO at step S61), the processing is returned to step S53, and the CPU 10 repeats the processing. On the other hand, when all the data has been read (YES at step S61), the CPU 10 subsequently executes a process for deleting the ghost 104 (step S62). This is the end of the ghost reproduction process.

With reference back to FIG. 26, after the ghost reproduction process is ended, the processing proceeds to step S4, and the CPU 10 determines whether or not to end the game.

Next described is processing to be performed in a case where it is determined, at step S5, that the operation has not been an instruction to reproduce the action of the ghost (NO at step S5). In this case, first, the CPU 10 determines whether or not the operation is an instruction to delete the ghost data (step S8). When it is determined that the operation is an instruction to delete the ghost data (YES at step S8), the CPU 10 clears the ghost data 130 (step S9). Further, the CPU 10 also deletes the moving path 108 (refer to FIG. 13 and the like) (step S10) generated in the ghost recording process. Subsequently, the processing proceeds to step S4.

On the other hand, when it is determined at step S8 that the operation is not an instruction to delete the ghost data (NO at step S8), the CPU 10 executes, in accordance with the operation data 126, other game processes (step S11) (a process of moving the player object, the hit determination process, and the like) than the ghost-related processes described above. Subsequently, the processing proceeds to step S4 and the CPU 10 executes determination of whether or not to end the game. This is the end of the game processing of the present embodiment.

As described above, in the present embodiment, information about the action of the ghost 104 controlled by the player is indicated in the form of the ghost information bar 105, the current icon 106, and the action marker 107. This allows the player to readily know in advance, during the cooperation play with the ghost 104, the action of the ghost 104, which has been controlled by the player. As a result, a smooth cooperation play between the ghost 104 and the player is realized, whereby the entertaining feature of the game is enhanced.

Also, an action of the ghost 104 is stored as the ghost operation data 132, which has the same structure as the operation data 126 representing the operation (which button has been pressed or the like) of the controller 7 performed by the player. Accordingly, the storage capacity can be reduced, as compared to a case where, for example, the action of the ghost is stored as position data of the objects in the virtual game space. Particularly, in the case of a three-dimensional virtual game space, when the ghost 104 performs an action that involves movement of an object (for example, the box 201 in FIG. 20 or the like) other than the ghost 104, it is also necessary to store the positional information about the object other than the ghost 104. However, storing the action in the form of the ghost operation data 132 eliminates the necessity to store such information, and the movement of the object other than the ghost 104 and the like are also reproduced when the action of the ghost is reproduced in accordance with the ghost operation data 132.

Moreover, it is possible, during the reproduction of the action of the ghost, to cancel the reproduction being performed. Accordingly, in a case where, for example, the player has tried a cooperation play with the ghost 104 in vain because of an wrong operation or the like, it is possible for the player to try again immediately, without waiting until the end of the reproduction of the action of the ghost.

In the embodiment described above, the silhouette image 109 generated at the time of recording the action of the ghost 104 is stored in the external main memory 12 and read at the time of reproduction of the action of the ghost. However, the present invention is not limited thereto, and the silhouette image 109 may be generated in real time by using the dedicated camera during the reproduction of the action of the ghost. This enables reduction of the capacity for storing the silhouette image data 133.

Further, while cancellation of the reproduction processing is allowed during the reproduction of the action of the ghost, cancellation of the recording processing may also be allowed during the recording of the action of the ghost. Accordingly, even when the player performs a wrong operation while recording the action of the ghost 104, it is possible for the player to immediately start recording again, without waiting until the end of the recording.

Moreover, in the example used in the embodiment described above, only one ghost 104 is used (the case where the ghost data 130 is the data corresponding to only one ghost). However, a plurality of ghosts 104 may be used. That is, a plurality of pieces of the ghost data 130 are prepared to represent the plurality of ghosts, and each piece of the ghost data is given an ID so as to be identified. Then, at the time of recording an action performed by one of the plurality of the ghosts 104, the action of the one of the plurality of the ghosts 104 is recorded in association with a corresponding ID of the ghost data 130. Thus, in providing an instruction to reproduce the action of the one of the plurality of the ghosts 104, the player can specify the corresponding ID of the ghost data. Further, a plurality of ghosts 104 may be caused to simultaneously appear in the virtual game space. In this case, a plurality of ghost information bars 105 are also displayed (for example, two ghost information bars 105 are arranged laterally in parallel), and the ghost information bars 105 are displayed with information that allows the correspondence between the ghosts and the ghost information bars 105 to be recognized. The use of a plurality of ghosts 104 further enhances the entertaining feature of the game.

Moreover, according to the embodiment described above, in the ghost recording mode, the operation of controlling the ghost 104 performed by the player is recorded until a predetermined time period of 10 seconds elapses after the appearance of the ghost 104. However, the present invention is not limited thereto, and recording of the operation of controlling the ghost 104 may be ended through a predetermined operation performed by the player, before the predetermined time period elapses. In this case, reproduced is the action of the ghost 104 during the time from the appearance of the ghost 104 to the termination of the recording of the ghost 104, which termination is performed through the operation by the player. For example, if recording of the control of the ghost 104 is ended when 5 seconds have elapsed after the appearance of the ghost 104, the action of the ghost 104 in accordance with the control performed during the 5 seconds will be reproduced. This enables the player to freely control the time period for recording the ghost 104, thereby enhancing the degree of freedom of operation by the player.

Moreover, with regard to the ghost reproduction mode, in the example used in the embodiment described above, the action of the ghost 104 is reproduced only once. However, the present invention is not limited thereto. For example, the action of the ghost 104 may be repeatedly reproduced until the player performs a predetermined operation. That is, the ghost reproduction process of step S7 may be repeatedly executed until an operation to provide an instruction to end the reproduction is performed by the player in other words, after the ghost reproduction process of step S7 is ended, unless an instruction to end the reproduction is provided by the player, the ghost reproduction process may be executed again. As described above, through the repeated reproduction of the action of the ghost 104, in a case where the player wants to perform a predetermined operation (for example, turning on switches simultaneously) in accordance with the movement of the ghost 104, the player is allowed to easily adjust to the timing at which the player should perform the operation. Moreover, when the player wants to cause the action of the ghost to be reproduced again after the ghost reproduction process is ended, there is no need for the player to perform a predetermined operation for causing the ghost reproduction process to be performed, whereby the convenience for the player is enhanced.

Furthermore, the repetition of the ghost reproduction process may be executed only when the player has failed in performing an intended operation. For example, as shown in FIG. 17, in a scene where two switches are to be simultaneously turned on, the player first performs an operation for providing an instruction to reproduce the action of turning on the switch 102b, which has been performed by the ghost 104. In response to this, reproduction of the action of the ghost 104 is started, and simultaneously, the player controls the player object 101. However, in a case where the player has missed the timing and failed in simultaneously turning on the switch 102, the reproduction processing of the ghost 104 may be executed again without the player performing an additional operation for providing an instruction to reproduce the action of the ghost. More specifically, as shown in FIG. 8 and FIG. 17, "event data" such an event as "In order to open the door, it is necessary to simultaneously turn on two switches." is prepared and stored in the external main memory 12 in advance. Then, in a case where the ghost 104 has performed the action of turning on one of the switches, the CPU 10 determines, with reference to the event data, whether or not a condition for clearing the event is satisfied, that is, in this example, whether or not the action of turning on the switch has been performed for the two switches at the same timing. As a result, when the condition is not satisfied, the ghost reproduction process is executed again, and when the condition is satisfied, processing of "opening the door" is performed. Accordingly, when the player has failed in a cooperation play with the ghost 104, automatic reproduction of the action of the ghost 104 is performed, thereby further enhancing the convenience for the player. Note that, when the condition is satisfied, the ghost reproduction process may be ended while the processing of "opening the door" is performed.

Further, in the embodiment described above, information about the action of the ghost 104 controlled by the player is indicated in the form of the ghost information bar 105, the current icon 106, and the action marker 107. However, the present invention is not limited thereto. For example, a time period from the current time to a time when a predetermined action (for example, action of swinging the sword) of the ghost 104 is performed may be indicated. This enables the player to know the timing at which the ghost 104 controlled by the player is to perform the predetermined action. As a result, a smooth cooperation play between the ghost 104 and the player is realized, thereby enhancing the entertaining feature of the game.

Industrial Applicability

The game apparatus and the game program according to the present invention enables the player to know in advance the action of the first object that performs an action in accordance with action information, and is useful for a stationary game apparatus, a hand-held game apparatus, and the like.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having a game program stored therein, the game program being executed by a computer of a game apparatus for controlling an action of a first object and an action of a second object arranged in a virtual game space, the game program causing the computer to perform functionality comprising:
 recording, in a memory, action information for controlling a series of at least one action performed by the first object,
 controlling the at least one action of the first object by reproducing the recorded action information,
 receiving an operation signal from a predetermined input device operated by a player while the at least one action of the first object is being controlled,
 controlling an action of the second object in accordance with the received operation signal, and
 displaying, on a screen, information about the at least one action of the first object being controlled while the action of the second object is being controlled, the information about the action of the first object is displayed separately from displaying the first object and is used to coordinate actions between the first and the second object.

2. The non-transitory computer-readable storage medium having a game program stored therein, according to claim 1, wherein
information indicating a timing at which the first object performs a predetermined action is displayed.

3. The non-transitory computer-readable storage medium having a game program stored therein, according to claim 1, wherein
information indicating a time period from a current time to a time when the first object, the at least one action of which is being controlled, performs a predetermined action is displayed.

4. The non-transitory computer-readable storage medium having a game program stored therein, according to claim 1, wherein
as the information about the at least one action of the first object, a current time image indicating a status of progress of the series of the at least one action of the first object indicated by the action information is displayed, and
a timing information image indicating, on a screen, at a position which corresponds to a time when the first object performs a predetermined action, that the predetermined action is to be performed is displayed.

5. The non-transitory computer-readable storage medium having a game program stored therein, according to claim 1, wherein
as the information about the at least one action of the first object, a total time information image, displayed in a form of a graph, indicating a time period taken for the series of the at least one action of the first object indicated by the action information is displayed,
a current time image indicating a status of progress of the series of the at least one action of the first object indicated by the action information is displayed, and
a timing information image indicating, on the total time information image, at a position which corresponds to a time when the first object performs a predetermined action, that the predetermined action is to be performed is displayed.

6. The non-transitory computer-readable storage medium having a game program stored therein, according to claim 5, wherein
as the current time image, a two-dimensional image indicating a posture of the first object the at least one action of which is being controlled is displayed.

7. The non-transitory computer-readable storage medium having a game program stored therein, according to claim 6, wherein
the game program further causes the computer to perform functionality comprising:
taking an image of the first object by using a second virtual camera different from a first virtual camera for taking an image of the virtual game space, and
generating the two-dimensional image in accordance with image data obtained from the taken image.

8. The non-transitory computer-readable storage medium having a game program stored therein, according to claim 1, wherein
the game program further causes the computer to perform functionality comprising:
controlling the at least one action of the first object in accordance with the operation signal from the predetermined input device operated by the player, and
storing, as the action information, data representing the at least one action of the controlled first object.

9. The non-transitory computer-readable storage medium having a game program stored therein, according to claim 8, wherein
in accordance with the operation signal from the predetermined input device operated by the player, the at least one action of the first object is controlled such that the first object performs at least a predetermined action.

10. The non-transitory computer-readable storage medium having a game program stored therein, according to claim 8, wherein the game program further causes the computer to perform functionality comprising:
storing, as the action information, operation data representing the operation signal from the predetermined input device during the time when the first object is being controlled.

11. The non-transitory computer-readable storage medium having a game program stored therein, according to claim 1, wherein
the game program further causes the computer to perform functionality comprising executing predetermined game processing in a case where a timing at which the first object being controlled has performed a predetermined action and a timing at which the second object being controlled has performed a predetermined action have satisfied a predetermined condition.

12. The non-transitory computer-readable storage medium having a game program stored therein, according to claim 1, wherein
the game program further causes the computer to perform functionality comprising:
cancelling controlling the at least one action of the first object when the at least one action of the first object is being controlled.

13. The non-transitory computer-readable storage medium having a game program stored therein, according to claim 4, wherein
the predetermined action includes a plurality of kinds of actions, and
the timing information image varies depending on the plurality of kinds of actions.

14. The non-transitory computer-readable storage medium having a game program stored therein, according to claim 1, wherein
the game program further causes the computer to perform functionality comprising displaying on the screen a moving path of the first object in accordance with the recorded action information.

15. The non-transitory computer-readable storage medium having a game program stored therein, according to claim 1, wherein
the game program further causes the computer to perform functionality comprising starting controlling again the at least one action of the first object when controlling the at least one action of the first object has ended.

16. The non-transitory computer-readable storage medium having a game program stored therein, according to claim 1, wherein
the game program further causes the computer to perform functionality comprising:
determining whether or not a timing at which the first object being controlled has performed a predetermined action and a timing at which the second object being controlled has performed a predetermined action have satisfied a predetermined condition, starting controlling again the at least one action of the first object when controlling the at least one action of the first object has ended, in a case where it is determined that the predetermined condition is not satisfied while the at least one action of the first object is being controlled, and executing predetermined game processing in a case where it is determined that the predetermined condition is satisfied while the at least one action of the first object is being controlled.

17. The non-transitory computer-readable storage medium having a game program stored therein, according to claim 8, wherein the game program further causes the computer to perform functionality comprising:

storing, as the action information, data representing the at least one action of the controlled first object in a case where the operation signal from the predetermined input device operated by the player represents a predetermined operation.

18. A game apparatus for controlling an action of a first object and an action of a second object arranged in a virtual game space comprising:

an action information storage unit for recording action information for controlling a series of at least one action performed by the first object;

a first object action reproduction unit for controlling the at least one action of the first object by reproducing the action information recorded in the action information storage unit;

an operation reception unit for receiving an operation signal from a predetermined input device operated by a player while the at least one action of the first object is being controlled by the first object action reproduction unit;

a second object control unit for controlling an action of the second object in accordance with the operation signal received by the operation reception unit; and an action information display unit for displaying, on a screen, information about the at least one action of the first object being controlled by the first object action reproduction unit while the second object is being controlled by the second object control unit, the information about the action of the first object is displayed separately from displaying the first object and is used to coordinate actions between the first and the second object.

19. A game system, comprising:

a display device having a screen for displaying image data; and a game apparatus operatively coupled with the display device and for controlling an action of a first object and an action of a second object arranged in a virtual game space, the game apparatus comprising:

an action information storage unit for recording action information for controlling a series of at least one action performed by the first object, a first object action reproduction unit for controlling the at least one action of the first object by reproducing the action information recorded in the action information storage unit, an operation reception unit for receiving an operation signal from a predetermined input device operated by a player while the at least one action of the first object is being controlled by the first object action reproduction unit, a second object control unit for controlling an action of the second object in accordance with the operation signal received by the operation reception unit, and an action information display unit for displaying, on the screen, information about the at least one action of the first object being controlled by the first object action reproduction unit while the second object is being controlled by the second object control unit, the information about the action of the first object is displayed separately from displaying the first object and is used to coordinate actions between the first and the second object.

20. A method implemented in an information processing apparatus having one or more processors and for controlling an action of a first object and an action of a second object arranged in a virtual game space, the method comprising:

recording, in a memory, action information for controlling a series of at least one action performed by the first object, controlling, via the one or more processors, the at least one action of the first object by reproducing the recorded action information, receiving an operation signal from a predetermined input device operated by a player while the at least one action of the first object is being controlled, controlling an action of the second object in accordance with the received operation signal, and displaying, on a screen, information about the at least one action of the first object being controlled while the action of the second object is being controlled, the information about the action of the first object is displayed separately from displaying the first object and is used to coordinate actions between the first and the second object.

21. The non-transitory computer-readable storage medium having a game program stored therein, according to claim 1, wherein the displayed information is used to synchronize actions between the first object and the second object.

* * * * *